United States Patent [19]
Bauman et al.

[11] Patent Number: 5,875,201
[45] Date of Patent: Feb. 23, 1999

[54] SECOND LEVEL CACHE HAVING INSTRUCTION CACHE PARITY ERROR CONTROL

[75] Inventors: Mitchell A. Bauman, Circle Pines; Donald W. Mackenthun, Fridley; Gary J. Lucas, Pine Springs; James L. Federici, Shoreview, all of Minn.

[73] Assignee: Unisys Corporation, Blue Bell, Pa.

[21] Appl. No.: 777,037

[22] Filed: Dec. 30, 1996

[51] Int. Cl.[6] .............................. G06F 11/00; G11C 29/00
[52] U.S. Cl. ................. 371/49.1; 371/51.1; 395/182.03; 395/185.06; 711/3; 711/113; 711/119
[58] Field of Search .................................... 371/51.1, 49.1, 371/49.2, 67.1, 40.11, 40.3; 364/243.41, 243.44, 243.45, 267, 267.4, 964.2, 964.27, 964.343; 395/183.01, 183.03, 183.05, 183.18, 185.06, 182.03, 182.04, 182.9, 185.01, 185.02; 711/3, 4, 5, 113, 118, 119, 145

[56] References Cited

U.S. PATENT DOCUMENTS

| | | | |
|---|---|---|---|
| 4,056,844 | 11/1977 | Izumi | 364/228.1 |
| 4,130,865 | 12/1978 | Heart et al. | 395/200.31 |
| 4,349,871 | 9/1982 | Lary | 364/228.1 |
| 4,426,681 | 1/1984 | Bacot et al. | 364/228.1 |
| 4,442,487 | 4/1984 | Fletcher et al. | 364/228.1 |

(List continued on next page.)

OTHER PUBLICATIONS

Dubois et al., "Effects of Cache Coherency in Multiprocessors", *IEEE Transactions on Computers*, vol. C–31, No. 11, Nov. 1982, pp. 1083–1099.

Wilson, Jr., "Hierarchical Cache/Bus Architecture for Shared Memory Multiprocessors", *IEEE*, 1987, pp. 244–252.

Sparacio, "Data Processing System With Second Level Cache", *IBM Technical Disclosure Bulletin*, vol. 21, No. 6, Nov. 1978, pp. 2468–2469.

Myers et al., "The Implementation", *The 80960 Microprocessor Architecture*, 1988, pp. 159–183.

Hinton et al., "Microarchitecture of the 80960 High–Integration Processors", Proceedings of the 1988 IEEE International Conference on Computer Design: VLSI in Computers and Processors—ICCD, 1988, pp. 362–365.

Bandyopadhyay et al., "Combining Both Micro–Code and Hardwired Control in RISC", *Computer Architecture News*, Mar. 1990, pp. 11–15. IEEE.

Bandyopadhyay et al., "Micro–Code Based RISC Architecture", 19th Southeastern Symposium on System Theory, Mar. 1987, pp. 411–414.

*Primary Examiner*—Trinh L. Tu
*Attorney, Agent, or Firm*—Nawrocki, Rooney & Sivertson, P.A.

[57] ABSTRACT

Method and apparatus for detecting and correcting memory storage data errors in a system utilizing parity error detection. An error detected in the memory storage device results in a parity error being reported, thereby causing the corresponding address location to be deactivated. Once deactivated, no further reading or writing is performed at that address location for a predetermined time period. The parity error reporting and address deactivation is accomplished without an access time penalty and requires a reduced number of I/O pins.

20 Claims, 21 Drawing Sheets

U.S. PATENT DOCUMENTS

| | | | |
|---|---|---|---|
| 4,445,174 | 4/1984 | Fletcher | 364/134 |
| 4,464,717 | 8/1984 | Keeley et al. | 711/112 |
| 4,521,851 | 6/1985 | Trubisky et al. | 395/394 |
| 4,525,777 | 6/1985 | Webster et al. | 364/228.3 |
| 4,551,799 | 11/1985 | Ryan et al. | 364/230.6 |
| 4,586,133 | 4/1986 | Steckler | 364/229 |
| 4,667,288 | 5/1987 | Keeley et al. | 394/183.01 |
| 4,701,844 | 10/1987 | Thompson et al. | 364/231.8 |
| 4,707,784 | 11/1987 | Ryan et al. | 364/241.9 |
| 4,719,568 | 1/1988 | Carrubba et al. | 364/242.3 |
| 4,755,930 | 7/1988 | Wilson, Jr. et al. | 711/122 |
| 4,794,521 | 12/1988 | Ziegler et al. | 364/228.1 |
| 4,807,110 | 2/1989 | Pomerene et al. | 364/243 |
| 4,843,542 | 6/1989 | Dashiell et al. | 364/228.1 |
| 4,860,192 | 8/1989 | Sachs et al. | 364/228.4 |
| 4,984,153 | 1/1991 | Kregness et al. | 364/228.1 |
| 4,985,829 | 1/1991 | Thatte et al. | 364/238.4 |
| 4,992,930 | 2/1991 | Gilfeather et al. | 364/228.6 |
| 4,992,934 | 2/1991 | Portanova et al. | 395/385 |
| 5,023,776 | 6/1991 | Gregor | 364/230 |
| 5,025,365 | 6/1991 | Mathur et al. | 364/230 |
| 5,025,366 | 6/1991 | Baror | 364/231.8 |
| 5,029,070 | 7/1991 | McCarthy et al. | 364/228.3 |
| 5,058,006 | 10/1991 | Durdan et al. | 364/228.1 |
| 5,095,424 | 3/1992 | Woffinden et al. | 364/222.81 |
| 5,136,696 | 8/1992 | Beckwith et al. | 395/587 |
| 5,148,533 | 9/1992 | Joyce et al. | 362/228.1 |
| 5,193,163 | 3/1993 | Sanders et al. | 364/240 |
| 5,197,139 | 3/1993 | Emma et al. | 364/243 |
| 5,206,945 | 4/1993 | Nishimukai et al. | 364/231.8 |
| 5,212,781 | 5/1993 | Shah | 711/122 |
| 5,222,224 | 6/1993 | Flynn et al. | 364/228.1 |
| 5,222,244 | 6/1993 | Carbine et al. | 395/800.41 |
| 5,226,146 | 7/1993 | Milia et al. | 711/141 |
| 5,241,641 | 8/1993 | Iwasa et al. | 364/243.41 |
| 5,265,232 | 11/1993 | Gannon et al. | 364/228.1 |
| 5,265,235 | 11/1993 | Sindhu et al. | 364/228.1 |
| 5,276,848 | 1/1994 | Gallagher et al. | 364/222.82 |
| 5,307,477 | 4/1994 | Taylor et al. | 364/243.41 |
| 5,313,602 | 5/1994 | Nakamura | 711/100 |
| 5,355,467 | 10/1994 | MacWilliams et al. | 711/146 |
| 5,359,723 | 10/1994 | Matthews et al. | 364/242.3 |
| 5,381,544 | 1/1995 | Okazawa et al. | 395/182.03 |
| 5,386,547 | 1/1995 | Jouppi | 364/243.45 |
| 5,392,416 | 2/1995 | Doi et al. | 364/243.41 |
| 5,423,016 | 6/1995 | Tsuchiya et al. | 711/123 |
| 5,490,261 | 2/1996 | Bean et al. | 364/243.41 |
| 5,524,233 | 6/1996 | Milburn et al. | 364/243.41 |
| 5,555,382 | 9/1996 | Thaller et al. | 395/293 |
| 5,577,259 | 11/1996 | Alferness et al. | 395/800.41 |
| 5,666,513 | 9/1997 | Whittaker | 711/118 |
| 5,680,571 | 10/1997 | Bauman | 711/122 |

| F0 | F1 | F2 | F3 | A27 | A28 | A37 | A38 | A39 | A40 | A41 | A42 | A43 | A44 | A45 | A46 | A47 | A48 | A49 | A50 | A51 | ← 802 FIRST CYCLE |
|----|----|----|----|-----|-----|-----|-----|-----|-----|-----|-----|-----|-----|-----|-----|-----|-----|-----|-----|-----|---|
| F4 | F5 | F6 | A21 | A22 | A23 | A24 | A25 | A26 | 0 | A29 | A30 | A31 | A32 | A33 | A34 | A35 | A36 | 0 | A52 | A53 | ← 804 SECOND CYCLE |

| F4 | F5 | F6 | A21 | A22 | A23 | A24 | A25 | A26 | 0 | A29 | A30 | A31 | A32 | A33 | A34 | A35 | A36 | 0 | A52 | A53 |
|---|---|---|---|---|---|---|---|---|---|---|---|---|---|---|---|---|---|---|---|---|
| 0 | 0 | 1 | 0 | 0 | 0 | 0 | 0 | 0 | 0 | 1 | 0 | 0 | 0 | 0 | 1 | 1 | 1 | 0 | 0 | 0 |

FIG. 20

SECOND LEVEL CACHE HAVING INSTRUCTION CACHE PARITY ERROR CONTROL

CROSS REFERENCE TO CO-PENDING APPLICATIONS

The present application is related to U.S. patent application Ser. No. 08/777,038, filed Dec. 30, 1996, entitled "Scalable Cross Bar Type Storage Controller", U.S. patent application Ser. No. 08/748,772, filed Nov. 14, 1996, entitled "Selectable Two-Way, Four-Way Double Cache Interleave Scheme", U.S. patent application Ser. No. 08/579,683, filed Dec. 28, 1995, entitled "Multi-Processor Data Processing System With Multiple, Separate Instruction and Operand Second Level Caches", U.S. patent application Ser. No. 07/762,282, filed Sep. 19, 1991, entitled "Cooperative Hardware and Microcode Control System for Pipelined Instruction Execution", and U.S. patent application Ser. No. 07/762,276, filed Sep. 19, 1991, entitled "Data Coherency Protocol for Multi-Level Cached High Performance Multi-processor System", all assigned to the assignee of the present invention and all incorporated herein by reference.

BACKGROUND OF THE INVENTION

1. Field of the Invention

The present invention relates to general purpose digital data processing systems, and more particularly, to such systems having second level cache memories with error recovery mechanisms.

2. Description of the Prior Art

In most general purpose digital computers, it is desirable to have a computer storage system which may detect, correct and dynamically remove a single-bit error without any penalty in performance. Single-bit errors are a predominant failure mode for static random access memories (SRAMs) and dynamic random access memories (DRAMs), especially those that have high densities which are currently used in large computer memories. With minimum feature sizes of less than 0.5 microns, single-bit errors are more likely to occur. Sources of contamination such as dust are proportionately increased in size relative to the individual transistors of high density SRAMs and DRAMs and are more likely to cause latent defects resulting in single-bit errors. In addition, as the minimum feature size shrinks, manufacturing tolerances become limiting thus making latent defects more likely to occur. The single-bit error recovery mechanism must be able to efficiently detect and correct these errors.

To minimize the impact on system performance, it is desirable that the single-bit error recovery mechanism be able to operate without system software intervention. If system software intervention is necessary, performance may suffer as additional data accesses to main memory may be required. In some applications, for example when errors reside in cache memory rather than main memory, it may not be necessary to perform error correction immediately, as long as the corrupted data is not passed to main memory before the error is corrected. It is still necessary, however, that the single-bit error recovery mechanism be able to remove or disable a single-bit error from the computing system in order to prevent single-bit failures from accumulating and eventually corrupting the main memory or leading to multiple bit errors. It is known that multiple bit errors may be difficult to detect and correct.

In multi-processor systems, the single-bit error recovery mechanisms may operate in conjunction with multi-segmented second level cache. In multi-processor systems, multiple requestors may request access to the same shared memory resource. Typically, the cache memory addressing is divided into segments, wherein the segments are mapped contiguously throughout the cache address space. Each of the multiple requestors may request access to the same memory segment simultaneously. Requests that are not able to be serviced immediately must be queued until they can be processed by a memory controller that manages the requests. Once requests are serviced, correction of any single-bit errors detected may result in additional delays in order to correct the error.

One approach which has been used to detect and correct single bit errors is to generate extra bits called check bits, which are stored with the data when writing information into a memory storage location. These extra check bits, along with the data stored in memory, form a code. The resulting code typically has a hamming distance of at least 3 for single-bit error correction. A disadvantage of this approach is that an additional clock cycle may be required to generate the check bits prior to writing the corresponding word and check bits to a memory storage location. Likewise, during a read operation, an additional clock cycle may be required to check the parity of the read data prior to providing the read word to the requester. To minimize the impact on both read and write access times, the memory may be operated in a pipeline fashion. The read data and check bits must be read from the memory and temporarily stored in a register. The read data and check bits read from memory are passed to a syndrome generator. The syndrome generator regenerates the check bits based on the read data, and compares the regenerated check bits with the stored check bits. The result of this comparison is the syndrome value. If no fault is detected, the syndrome value is typically zero. If a single-bit fault is detected, the syndrome value is typically non-zero, and may identify the bit position in which the error occurred. The syndrome value must be passed to a decoder which creates a master bit vector based on the syndrome value. The master bit vector may then be presented to correction logic, which may toggle the appropriate data bit from the uncorrected read register to provide a corrected read data word. The data is then passed to a corrected read register where an error report may be generated. A limitation of this approach is that an additional clock cycle may be required to complete the correction for each read access of the memory in order to regenerate the check bits and perform the comparison. This additional clock cycle may be required whether or not the data requires correction. In summary, this approach requires additional clock cycles for both read and write operations which may result in penalties in access time performance.

SUMMARY OF THE INVENTION

The present invention overcomes the disadvantages found in the prior art by providing a method and apparatus for detecting and correcting memory storage data errors without an access time penalty in a system utilizing parity error detection. Once an error is detected in the cache memory storage device, the parity error is reported and the corresponding cache address location is deactivated. Once deactivated, no further reading or writing may be performed at that address location for a predetermined time period. Data retrieved from main memory storage is placed in a different cache address location. The parity error checking is accomplished without an access time penalty since data correction is not required. This invention requires a limited number of input/output pins for parity error reporting and cache address deactivation.

In an exemplary embodiment of the present invention, the parity error pin configuration is configured in an entry-level (EC) configuration. The EC configuration is a reduced size system and may include storage data ASIC 0, storage data ASIC 1 and storage address ASIC 0. The cache memory storage has a plurality of segments, where each of the plurality of segments has a plurality of address locations. An instruction cache is associated with each segment and utilizes parity error detection through means well known in the art. The instruction cache does not require direct error correction using an error correction code scheme, because it only contains a copy of what is stored in the memory storage units. When a parity error is detected upon reading the instruction cache, a valid copy of the data may be obtained from one of the two memory storage units utilized in the EC configuration.

The instruction processor may send a request to storage address ASIC 0. The request address comprises a block address and a set address. Second level cache tag segment 0 may be accessed if segment 0 is being requested, and second level cache tag segment 1 may be accessed if segment 1 is being requested. The set address is presented to either second level cache tag segment 0 or second level cache tag segment 1, depending upon which segment is being accessed. A cache hit occurs if the block address of the portion of the request address matches the block address portion stored within the second level cache tag, and a cache miss occurs if the block address portion of the request address does not match the block address contained within the second level cache tag. If the requested block address is not contained within second level cache tag segment 0 or second level cache tag segment 1, a request may be made to the memory storage units or to the remote storage controller.

In the EC configuration, storage data ASIC 0 has an instruction cache associated with each of segments 0 and 1, and storage data ASIC 1 has an instruction cache associated with each of segments 0 and 1. Each storage data ASIC has two pins for reporting instruction cache parity errors, or one pin for each segment. These pins couple to storage address ASIC 0. If an instruction cache parity error is detected upon reading the instruction cache for either segment 0 or segment 1, the error is reported to storage address ASIC 0 on the path corresponding to the segment and storage data ASIC for which the error occurred. Once storage address ASIC 0 receives the instruction cache parity error report, a request may be sent to degrade the offending code address block. Once degraded, the offending cache address block is not used again for a predetermined time period, and all subsequent requests during this time period will use other non-degraded cache address blocks. The memory storage units will then be accessed to retrieve the requested data. When a requester such as an instruction processor receives the data containing the parity error, it will reissue another request to the storage controller for the same cycle line. This time since the tag location that claimed a hit on the original requested address is now degraded, the reissued request is detected as a miss in the SLC. Once the data is retrieved, it is delivered to the instruction processor and it will be placed within a different block within the second level cache for subsequent references. Once the predetermined time period ends, the offending cache address block must be degraded again if a subsequent parity error occurs.

In the exemplary embodiment, storage address ASIC 0 may have parity error input logic. The parity error input logic may receive and store parity error report signals from any of the four paths coupled to storage address ASIC 0. Once the parity error report is stored, a request may be sent so that a priority determination is made. If, for example, a read request is received at the same time as an instruction cache parity error request, the instruction cache parity error request may be selected for priority. Once chosen for priority, the instruction cache address corresponding to the parity error report may be degraded so that the address location is not referenced again.

In the preferred embodiment of the present invention, the parity error pin configuration may be in the maximum-level (MC) configuration. The parity error pin configuration may include storage data ASICs 0 through 3 and storage address ASICs 0 and 1. In the MC configuration, each storage data ASIC may have two pins for reporting instruction cache parity errors on one pin for each pair of segments. In the preferred embodiment, storage data ASICs 0 through 3 may each report parity errors for segments 0 and 2 on a first one of two paths, and may report parity errors for segments 1 and 3 on a second path. Each storage data ASIC may report parity errors for segments 0 and 2 to storage address ASIC 0, and may report parity errors for segments 1 and 3 to storage address ASIC 1. Thus, storage address ASICs 0 and 1 each have four input pins to receive parity error reports from each of storage data ASICs 0 through 3. In the MC configuration, each storage data ASIC has a second level cache associated with each of segments 0 through 3. If one of storage data ASICs 0 through 3 detects an instruction cache parity error upon reading the instruction cache for segment 0, 1, 2 or 3, the storage data ASIC detecting the error sends a parity error report signal to the corresponding storage address ASIC to report the error. The storage address ASIC receiving the parity error sends a request to the instruction cache tag to degrade the offending cache address block. Once degraded, the offending cache address block is not used again for a predetermined time period and all subsequent requests during this time period will use other non-degraded cache address blocks. The memory storage units will then be accessed to retrieve the requested data. When a requester such as an instruction processor receives the data containing the parity error, it will reissue another request to the storage controller for the same cache line. This time since the tag location that claimed a hit on the original requested address is no degraded, the reissued request is detected as a miss in the SLC. Once the data is retrieved, it is delivered to the instruction processor and it will be placed in a different block within the second level cache for subsequent references. Once the predetermined time period ends, the offending cache address block must be degraded again if a subsequent parity error occurs.

In the preferred embodiment, storage address ASIC 0 and storage address ASIC 1 may each have parity error input logic. The parity error input logic may receive and store parity error report signals from any of the four paths coupled to either storage address ASIC 0 or storage address ASIC 1. Once the parity error report is stored, a request may be sent so that a priority determination is made. If, for example, a read request is received at the same time as an instruction cache parity error request, the instruction cache parity error request may be selected for priority. Once chosen for priority, the instruction cache address corresponding to the parity error report may be degraded so that the address location is not referenced again.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 15 is a diagram showing the instruction processor to storage controller address format;

FIG. 20 is a diagram showing the address format for degrading the instruction cache.

DETAILED DESCRIPTION OF THE PREFERRED EMBODIMENTS

Figure 1:
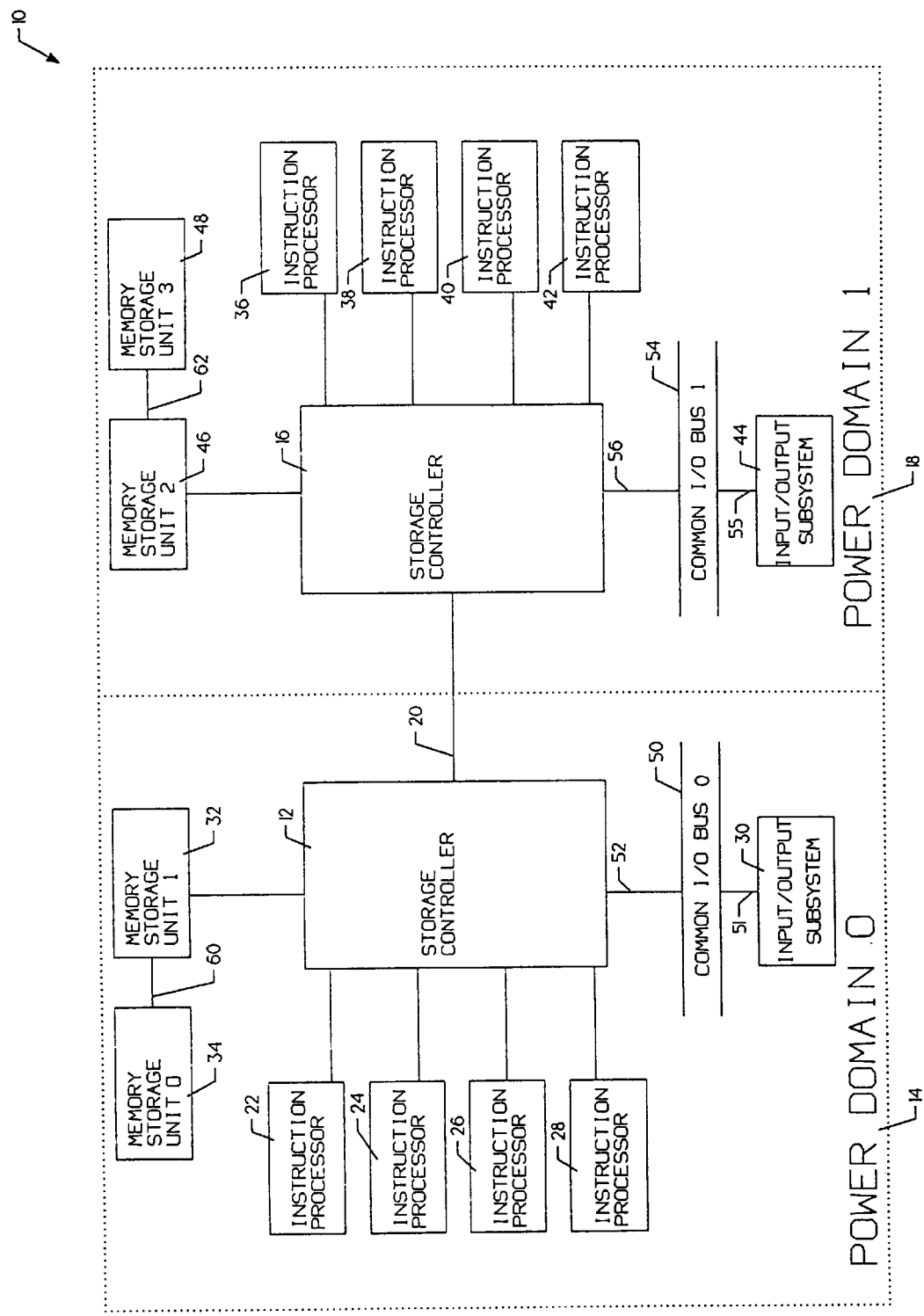
FIG. 1 is a schematic diagram of a fully populated data processing system incorporating the present invention.

FIG. 1 is an overall diagram of fully populated data processing system 10 according to the present invention. Data processing system 10 includes two individual processing clusters each contained within its own power domain. Furthermore, each individual processing cluster has its own storage controller and point-to-point communication with the other cluster via a storage controller-to-storage controller interface.

Storage controller 12 is contained within power domain 0–14, and storage controller 16 is contained within power domain 1–18. Storage controller 12 is coupled to storage controller 16 via interface 20. Storage controller 12 is fully populated with instruction processor 22, instruction processor 24, instruction processor 26, instruction processor 28, input/output subsystem 30, main memory module 32 and main memory module 34. Storage controller 16 is fully populated with instruction processor 36, instruction processor 38, instruction processor 40, instruction processor 42, input/output subsystem 44, main memory module 46 and main memory module 48. Storage controller 12 is coupled to common I/O bus 50 via path 52, and the common I/O bus 50 is coupled to input/output subsystem 30 via path 51. Storage controller 16 is coupled to common I/O bus 54 via path 56, and the common I/O bus 54 is coupled to input/output subsystem 44 via path 55. Main memory module 32 is coupled to main memory module 34 vial path 60. Main memory module 46 is coupled to main memory module 48 via path 62. Each of instruction processors 22, 24, 26 and 28 (along with similar instruction processors 36, 38, 40, and 42) has internal dedicated cache resources in the form of an instruction cache and an operand cache. These elements, along with the associated data invalidity logic, are described in more detail below. A more general description of the construction and operation of instruction processors 22, 24, 26 and 28 (along with similar instruction processors 36, 38, 40, and 42) may be found in the above-referenced and commonly assigned co-pending U.S. patent application Ser. No. 07/762,276, filed Sep. 19, 1991, entitled "Data Coherency Protocol for Multi-Level Cached High Performance Multi-Processor System" which has been incorporated by reference.

Input/output subsystem 30 may consist of an I/O bridge, plus other I/O channels like Input/Output processors and channel modules currently available, such as found in the Unisys 2200/600 series. Input/Output subsystem 44 may be similarly configured. Main memory storage units 32, 34, 46, and 48 are specific to the Unisys ITASCA Model series.

Figure 2:
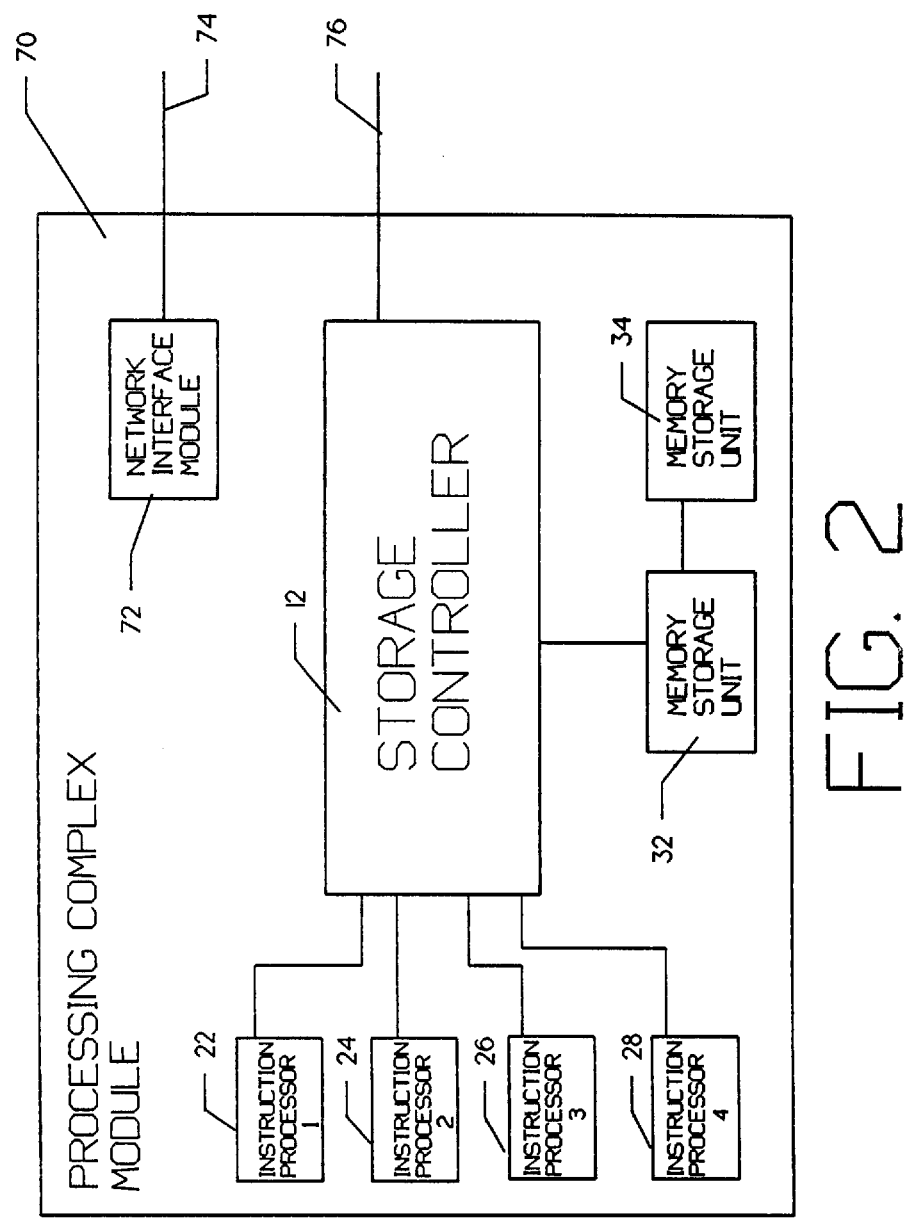
FIG. 2 is a pictorial diagram showing the packaging arrangement of the data processing system of FIG. 1.

FIG. 2 is a schematic diagram showing the packaging of a portion of data processing system 10. A major physical element of data processing system 10 is Processing Complex Module, PCM 70. Within fully populated PCM 70 is located instruction processors 22, 24, 26 and 28 (i.e., IP 1, IP 2, IP 3 and IP 4). In the preferred mode, each of these instruction processors is packaged on a single high density circuit board. The memory storage units 32 and 34 are coupled to storage controller 12 as explained above.

Network interface module (i.e., NIM) 72 provide an interface to the operator console via interface 74. Interface 76 couples input/output subsystem 30 (see also, FIG. 1) to storage controller 12. Input/output processors are physically packaged in an Input/output Complex Module (i.e., ICM) which is not shown for clarity. Other referenced elements are as previously described.

Figure 3:
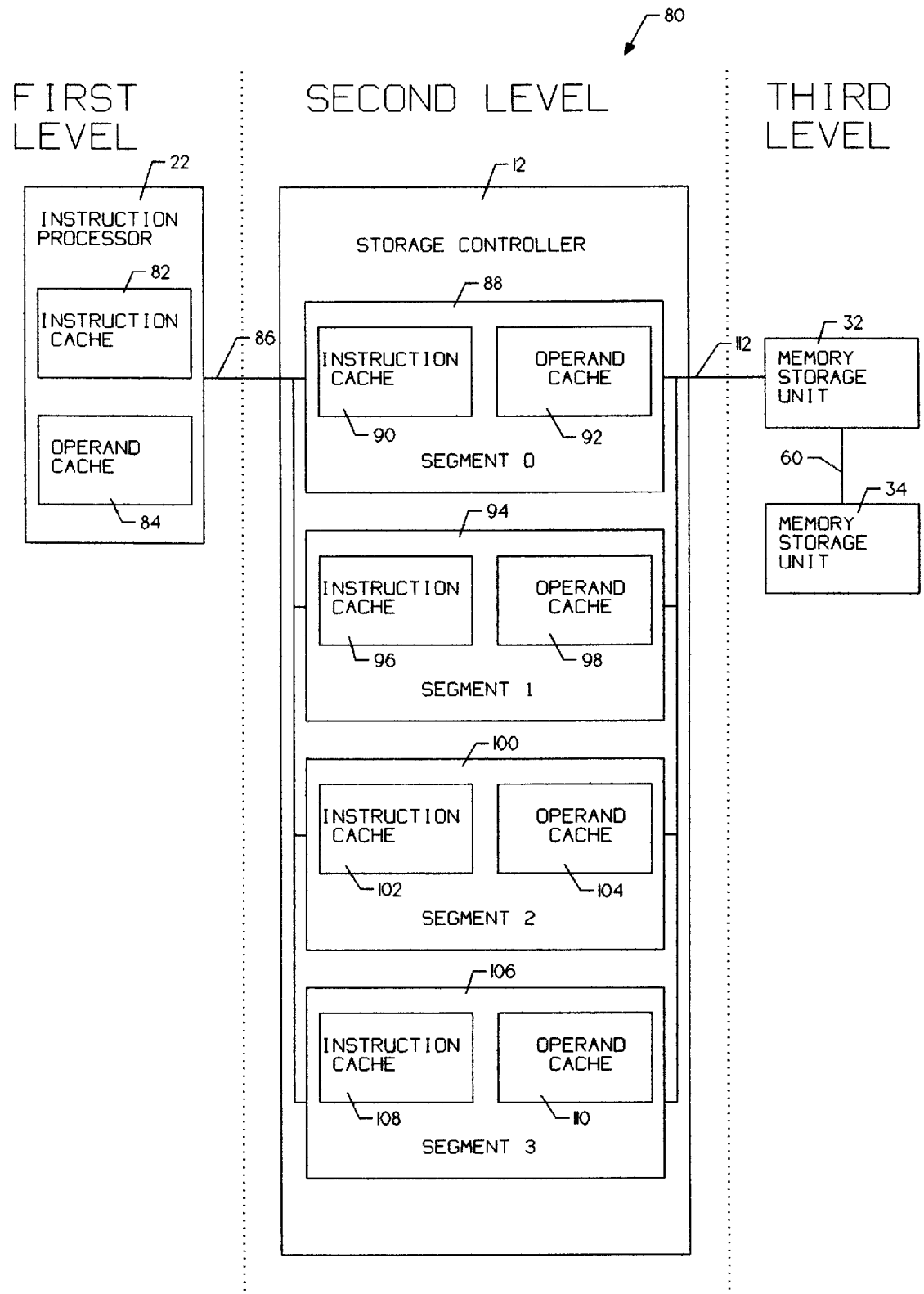
FIG. 3 is a schematic diagram of the levels of storage for a single instruction processor.

FIG. 3 is a diagram 80 showing the hierarchical arrangement of the three levels of storage within data processing system 10. Instruction processor 22 is within the first level of storage and contains an instruction cache 82 and an operand cache 84, each storing 8 k of 36-bit words. These are internal to instruction processor 22 and dedicated to the operations undertaken therein. By partitioning the internal dedicated cache resources in this manner, there is a certain concurrence of cache accesses associated with normal instruction execution.

Upon the request of instruction processor 22 to access a particular data element as either an instruction or operand, the directory of instruction cache 82 or operand cache 84, respectively, is queried to determine if the required data element is present within the associated cache resource. If the data element is present and valid, the access is completed at that level. If not, access is made to storage controller 12 via interface 86 for the block of eight 36-bit words containing the desired data element. A more detailed explanation of the operation of instruction cache 82 and operand cache 84 is found below.

Storage controller 12 is within the second level of storage. The storage controller contains multiple segments wherein each segment contains a 128 k 36-bit word instruction cache and a 32 k 36-bit words operand cache. In the present illustration, second level cache segment 0-88 has instruction cache 90 and operand cache 92, second level cache segment 1-94 has instruction cache 96 and operand cache 98, second level cache segment 2-100 has instruction cache 102 and operand cache 104, and second level cache segment 3-106 has instruction cache 108 and operand cache 110. These cache resources are shared by all users of the two memory storage units within the cluster to include both local and remote users. Any memory request to storage controller 12 is routed to the appropriate directory of instruction cache 90 or operand cache 92 in second level cache segment 0-88, instruction cache 96 or operand cache 98 in second level cache segment 1-94, instruction cache 102 or operand cache 104 in second level cache segment 2-100, or instruction cache 108 or operand cache 110 in second level cache segment 3-106 to determine if the desired data element is present and valid. Each of the instruction and operand cache memories within second level cache segment 0-88, second level cache segment 1-94, second level cache segment 2-100 or second level cache segment 3-106 are partitioned in address space to correspond to a particular address space within memory storage unit 32 or memory storage unit 34. As this routing is based upon the address requested, a particular second level instruction or operand cache resource within a particular segment will be accessed to determine if a requested data element is present before requesting the data element from memory storage unit 32 or memory storage unit 34 within the third level of storage.

If present and valid, the requested data element is supplied as an eight word block. If the requested data element is not validly present in either of instruction cache 90 or operand cache 92 in second level cache segment 0-88, instruction cache 96 or operand cache 98 in second level cache segment 1-94, instruction cache 102 or operand cache 104 in second level cache segment 2-100, or instruction cache 108 or operand cache 110 in second level cache segment 3-106 (depending upon the requested address), the data will then be requested from the third level of storage. Storage controller 12 is coupled to memory storage units 32 and 34 in the third level of storage via interface 112. In the preferred mode, memory storage units 32 and 34 each contain up to 256 meg. words of storage.

Each data element request to storage controller 12 is made through a separate interface. For a fully populated system, this includes four instruction processors, one input/output processor, and one other storage controller (see also, FIG. 1). The two configurations typically used are the entry-level (EC) configuration (see, also FIG. 4) and the maximum-level (MC) configuration (see also, FIG. 5). In addition there are four address interleave choices available. These are the EC configuration with and without address interleave, and the MC configuration with and without address interleave. Each data element request as discussed above is divided between instruction cache 90 or operand cache 92 in second level cache segment 0-88, instruction cache 96 or operand cache 98 in second level cache segment 1-94, instruction cache 102 or operand cache 104 in second level cache segment 2-100, or instruction cache 108 or operand cache 110 in second level cache segment 3-106, depending upon the requested address. Only if the requested data element is not validly present in the appropriate second level cache resource is an access request made to the third level of storage to memory storage units 32 or 34.

Figure 4:
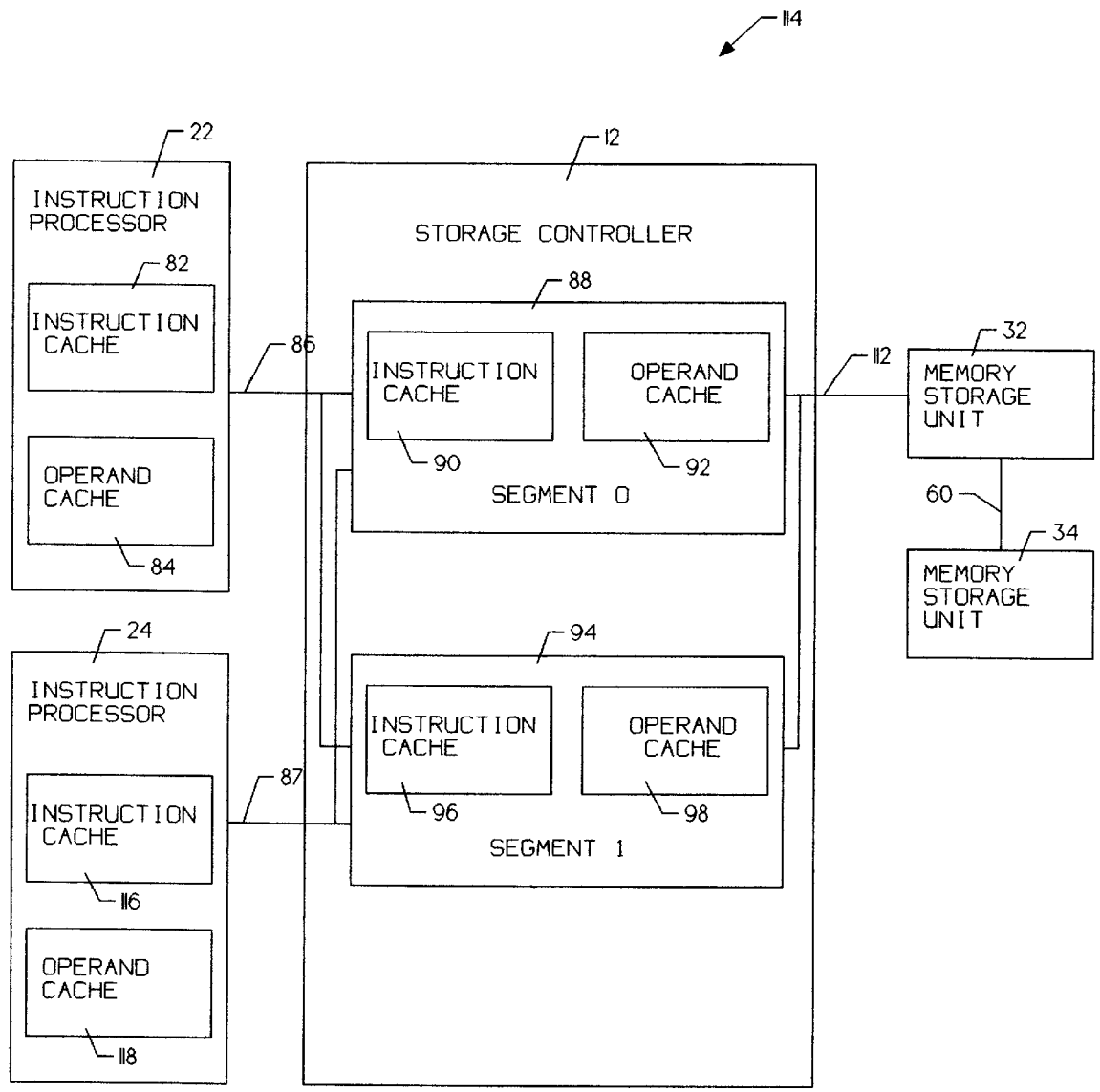
FIG. 4 is a schematic diagram showing the entry-level (EC) configuration.

FIG. 4 is a diagram 114 showing the entry-level (EC) configuration of the three levels of storage within data processing system 10. Instruction processor 22 which contains instruction cache 82 and an operand cache 84, and instruction processor 24 which contains instruction cache 116 and operand cache 118, are within the first level of storage. Instruction cache 82 and operand cache 84, as well as instruction cache 116 and operand cache 118, each store 8 k of 36-bit words. These are internal to instruction processor 22 and instruction processor 116 and are dedicated to the operations undertaken therein. Thus by partitioning the internal dedicated cache resources in this manner, there is a certain concurrence of cache accesses associated with normal instruction execution.

Upon the request of either instruction processor 22 or instruction processor 116 to access a particular data element as either an instruction or operand, the directory of instruction cache 82 or operand cache 84 in the case of instruction processor 22, or instruction cache 116 or operand cache 118 in the case of instruction processor 24 is queried to determine if the required data element is present within the associated cache resource. If the data element is present and valid, the access is completed at that level. If not, in the case of instruction processor 22, it will make an access to storage controller 12 via interface 86 for the block of eight 36-bit words containing the desired data element. In the case of instruction processor 24, interface 87 is used.

Storage controller 12 is within the second level of storage. The storage controller contains two segments in the EC mode which can support up to two instruction processors. Each segment contains a 128 k 36-bit word instruction cache and a 32 k 36-bit words operand cache. In the EC configuration, second level cache segment 0-88 has instruction cache 90 and operand cache 92, and second level cache segment 1-94 has instruction cache 96 and operand cache 98. These cache resources are shared by all users of the two memory storage units within the cluster to include both local and remote users. Any memory request to storage controller 12 is routed to the appropriate directory of instruction cache 90 or operand cache 92 in second level cache segment 0-88, or instruction cache 96 or operand cache 98 in second level cache segment 1-94 to determine if the desired data element is present and valid. Each of the instruction and operand cache memories within second level cache segment 0-88 or second level cache segment 1-94 are partitioned in address space to correspond to a particular address space within memory storage unit 32 or memory storage unit 34. As this routing is based upon the address requested, a particular second level instruction or operand cache resource within a particular segment will be accessed to determine if a requested data element is present before requesting the data element from memory storage unit 32 or memory storage unit 34 within the third level of storage.

If present and valid, the requested data element is supplied as an eight word block. If the requested data element is not validly present in either of instruction cache 90 or operand cache 92 in second level cache segment 0-88, or instruction cache 96 or operand cache 98 in second level cache segment 1-94, (depending upon the requested address), the data will then be requested from the third level of storage. Storage controller 12 is coupled to memory storage units 32 and 34 in the third level of storage via interface 112. In the preferred mode, memory storage units 32 and 34 each contain up to 128 meg. words of storage.

Figure 5:
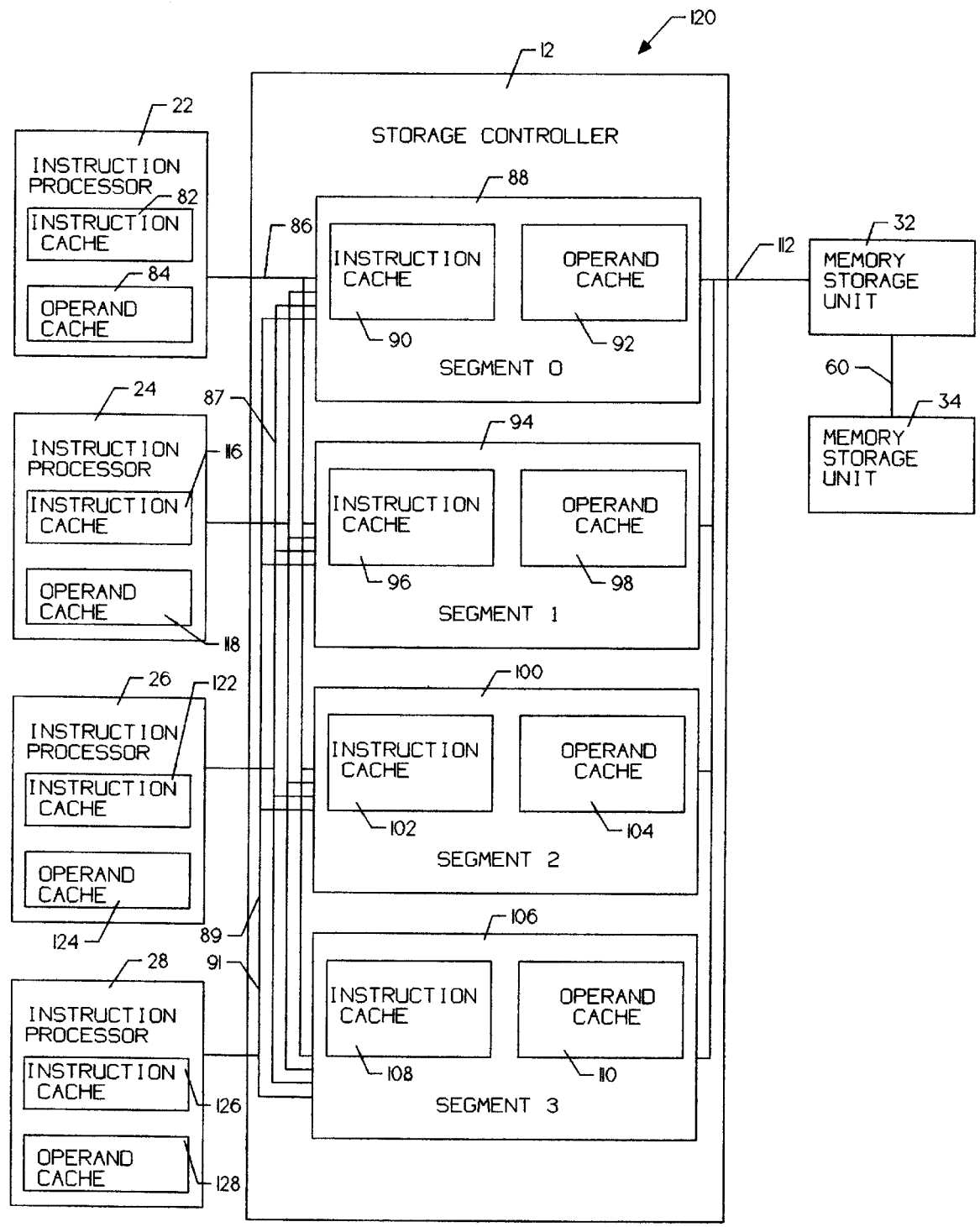
FIG. 5 is a schematic diagram showing the maximum-level (MC) configuration.

FIG. 5 is a diagram 120 showing the maximum-level (MC) configuration of the three levels of storage within data processing system 10. Instruction processor 22 which contains instruction cache 82 and an operand cache 84, instruction processor 24 which contains instruction cache 116 and operand cache 118, instruction processor 26 which contains instruction cache 122 and operand cache 124, and instruction processor 28 which contains instruction cache 126 and operand cache 128, are each within the first level of storage. Each instruction cache 82, 116, 122 and 126, as well as each operand cache 84, 118, 124 and 128, can store 8 k of 36-bit words. Each instruction or operand cache within a particular instruction processor are internal to that instruction processor (e.g. instruction processor 22, 24, 26 or 28) and are dedicated to the operations undertaken therein. Thus by partitioning the internal dedicated cache resources in this manner, there is a certain concurrency of cache accesses associated with normal instruction execution.

Upon the request of either instruction processor 22, instruction processor 24, instruction processor 26 or instruction processor 28 to access a particular data element as either an instruction or operand, the directory of instruction cache 82 or operand cache 84 in the case of instruction processor 22, instruction cache 116 or operand cache 118 in the case of instruction processor 22, instruction cache 122 or operand cache 124 in the case of instruction processor 26, or instruction cache 126 or operand cache 128 in the case of instruction processor 28, are queried to determine if the required data element is present within the associated cache resource. If not, in the case of instruction processor 22, it will make an access to storage controller 12 via interface 86 for the block of eight 36-bit words containing the desired data element. In the case of instruction processor 24, interface 87 is used; for instruction processor 26, interface 89 is used; and for instruction processor 28, interface 91 is used.

Storage controller 12 is within the second level of storage. The storage controller contains four segments in the MC mode which can support up to four instruction processors. Each segment contains a 128 k 36-bit word instruction cache and a 32 k 36-bit words operand cache. In the MC configuration, second level cache segment 0-88 has instruction cache 90 and operand cache 92, second level cache segment 1-94 has instruction cache 96 and operand cache 98, second level cache segment 2-100 has instruction cache 102 and operand cache 104, and second level cache segment 3-106 has instruction cache 108 and operand cache 110. These cache resources are shared by all users of the two memory storage units within the cluster to include both local and remote users. Any memory request to storage controller 12 is routed to the appropriate directory of instruction cache 90 or operand cache 92 in second level cache segment 0-88, instruction cache 96 or operand cache 98 in second level cache segment 1-94, instruction cache 102 or operand cache 104 in second level cache segment 2-100, or instruction cache 108 or operand cache 110 in second level cache segment 3-106, to determine if the desired data element is present and valid. Each of the instruction and operand cache memories within second level cache segment 0-88, second level cache segment 1-94, second level cache segment 2-100 or second level cache segment 3-106 are partitioned in address space to correspond to a particular address space within memory storage unit 32 or memory storage unit 34. As this routing is based upon the address requested, a particular second level instruction or operand cache resource within a particular segment will be accessed to determine if a requested data element is present before requesting the data element from memory storage unit 32 or memory storage unit 34 within the third level of storage.

If present and valid, the requested data element is supplied as an eight word block. If the requested data element is not validly present in either instruction cache 90 or operand cache 92 in second level cache segment 0-88, instruction cache 96 or operand cache 98 in second level cache segment 1-94, instruction cache 102 or operand cache 104 in second level cache segment 2-100, or instruction cache 108 or operand cache 110 in second level cache segment 3-106, (depending upon the requested address), the data will then be requested from the third level of storage. Storage controller 12 is coupled to memory storage units 32 and 34 in the third level of storage via interface 112. In the preferred mode, memory storage units 32 and 34 each contain 256 meg. words of storage. In the MC mode, the total address space partitioned within memory storage units 32 and 34 to correspond to the instruction and operand cache memories within second level cache segment 0-88, second level cache segment 1-94, second level cache segment 2-100 or second level cache segment 3-106 is the same as the total address space partitioned to correspond to the instruction and operand cache memories within the two segments of the entry-level (EC) configuration.

Figure 6:
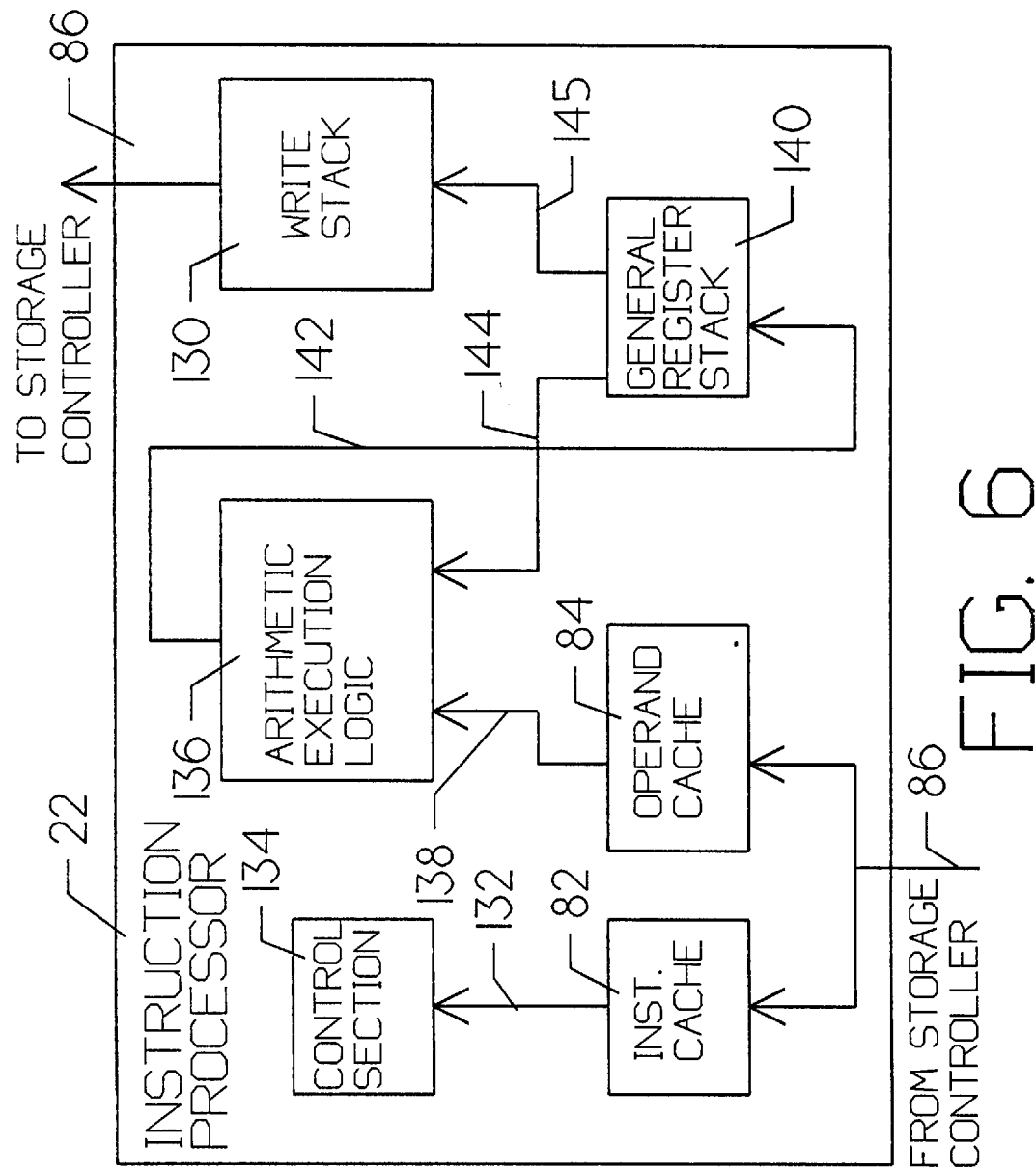
FIG. 6 is a simplified block diagram showing the major elements of the instruction processor.

FIG. 6 is a simplified block diagram of instruction processor 22 showing the major data and control paths. Interface 86, providing the data transfer path between storage controller 12 and instruction processor 22, is actually a two-way path. Data is accessed by storage controller 12 and routed to either instruction cache 82 or operand cache 84 depending upon whether the initial request was for instruction data or operand data. In accordance with usual local cache operation, instruction cache 82 and operand cache 84 temporarily store the data for use by instruction processor 22. Interface 86 also couples write data from write stack 130 to storage controller 12 for longer term storage. Priority for this shared interface is ordinarily given to read data requests requiring write data to be queued in write stack 130. The exception to giving priority to read data is whenever data is to be read from a location for which a write access has been queued.

Instructions from instruction cache 82 are provided via path 132 to control section 134 for decoding via microcode controller and hardwired control logic. Arithmetic execution logic 136 receives operand data via path 138 and performs the specified operation using a combination of microcode control and hardwired control as explained in greater detail below.

Most arithmetic instructions operate upon data which is temporarily stored in general register stack 140. This permits most rapid access to the data, because that data is directly accessed from an extremely fast storage stack. Similarly, arithmetic results are often returned to general register stack 140 for temporary storage until further arithmetic processing. Data is routed to general register stack 140 by path 142. Data from general register stack 140 is routed back to arithmetic execution logic 136 via path 144 and to write stack 130 via path 142. The data transferred to write stack 130 is queued for storage by storage controller 12 as discussed above.

Figure 7:
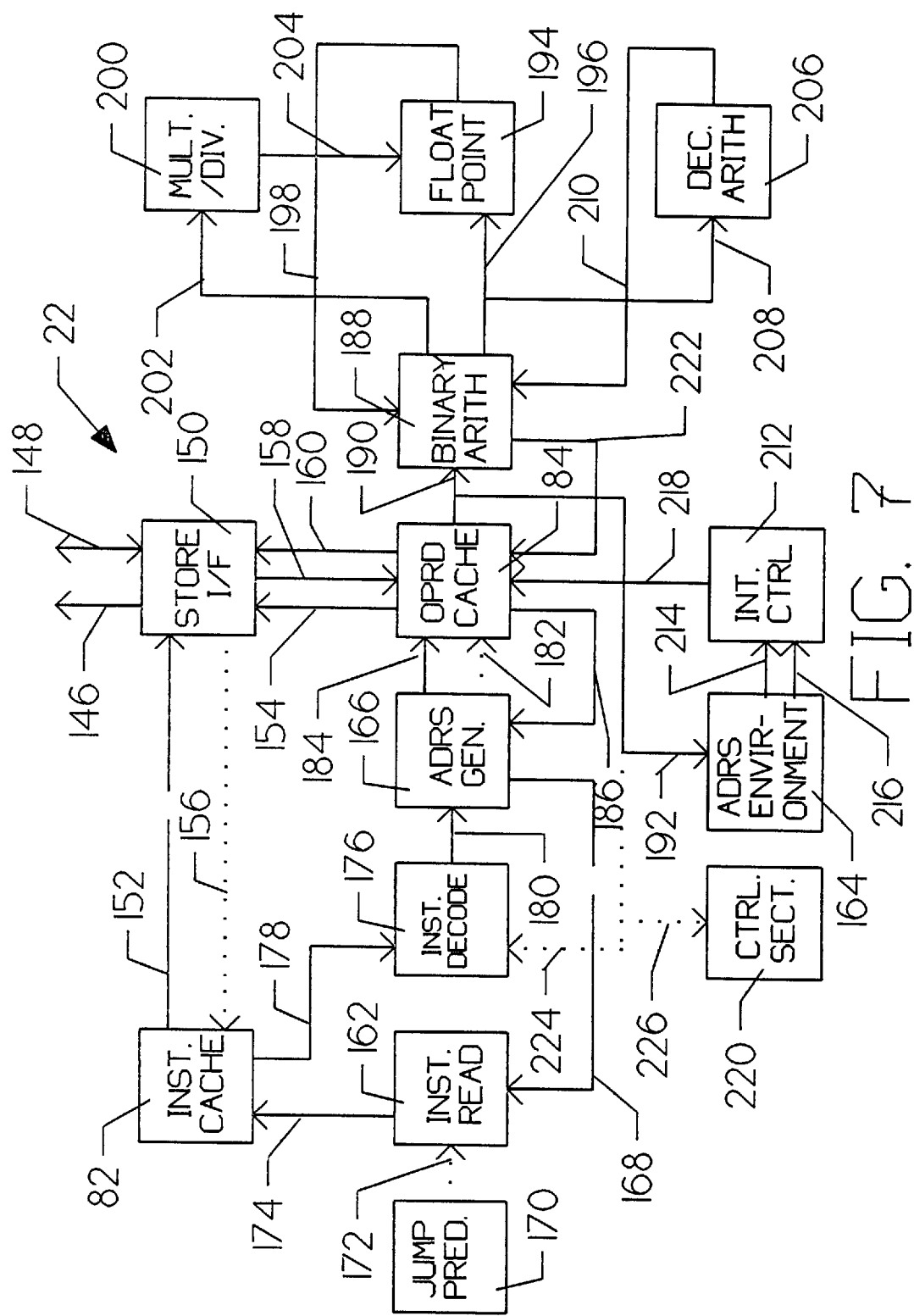
FIG. 7 is a detailed block diagram of the instruction processor.

FIG. 7 is a more detailed block diagram of instruction processor 22. The major data paths are shown, with the solid line paths signifying 72 bit, double word, transfer paths; the dashed line paths signifying addressing paths; and the dotted lines indicating data paths of no greater the 36 bits. Control line paths are not shown for clarity.

The interface to storage controller 12 is via interface 86, as described above. It consists of write interface 146 and read/write interface 148. Each of these data paths couples a 72-bit double word in parallel fashion. The function of write stack 130 (see also FIG. 4) is incorporated within store interface 150 which also provides the request/acknowledge, synchronization logic. Addressing information for store interface 150 is sent from instruction cache 82 via interface 152 and operand cache 84 via interface 154 for a corresponding cache miss. Instructions are sent to instruction cache 82 via path 156. Because instructions are 36-bit words, path 156 has a width of 36 bits. Operand data read by storage controller 12 is transferred from store interface 150 to operand cache 84 by path 158. Similarly, write operand data is sent from operand cache 84 to store interface 150 via path 160. Both path 158 and path 160 have a width of 72 bits to accommodate double word operands.

Instructions to be executed are addressed by instruction read 162. The addresses are computed using one of the base registers located within address environment 164. If the instruction is the next sequential instruction, its address is determined by incrementing the program address counter. If the instruction to be executed is addressed by a branch or jump instruction, the address may be computed by address generator 166 and supplied via path 168. Alternatively, the address may be supplied by jump prediction 170 via path 172 during operation in the jump prediction mode as explained in detail below. The address of the next instruction is provided to instruction cache 82 via path 174.

The next addressed instruction is fetched from instruction cache 82 if a match is found. If the request results in a cache miss, storage controller 12 is requested to read the memory block containing the instruction as discussed above. In either case, the instruction is provided to instruction decoder 176 via path 178. The instruction is decoded through the use of a microcode controller by instruction decode 176, and the operand address is computed by address generator 166 from the data received via path 180.

Operand cache 84 contains general register stack 140 (see also, FIG. 4). The cache is addressed by the output of address generator 166 received from path 182. Direct operands are received on path 184. If a match is not made in operand cache 84, a read request is made of storage controller 12 through store interface 150 as explained above. If a match is found in operand cache 84 or if the instruction specifies a direct operand received on path 184, the operand data is more immediately produced. In either case, the operand data is routed in accordance with the operation to be performed as specified by the instruction. Indirect operands cause the new operand address to be transferred to address generator 166 via path 186. Operands are transferred to binary arithmetic 188 for mathematical computation via path 190 or to address environment 164 via path 192.

Binary arithmetic 188 provides the basic control for all arithmetic operations to be performed on data received via path 190. Floating point operations are scaled and controlled by floating point logic 194 which receives operand data on path 196. Floating point results are returned to binary arithmetic 188 by path 198. Mult./div. 200 performs the basic multiplication and division operations for fixed point instructions. Operand data is received via path 202 and the products/quotients returned via path 204 and floating point logic 194. Decimal arithmetic 206 receives operand data on path 208 and returns results via path 210. Decimal arithmetic performs special purpose decimal operations.

Another category of instructions involves a change to the base registers within the addressing environment 164. The data is supplied to addressing environment 164 via path 192.

Base register contents are supplied to interrupt control 212 via paths 214 and 216. Interrupt control 212 provides the interrupt data to operand cache 84 via path 218. Control section 220 provides the overall microcode control.

The operation of instruction processor 22 is intended to occur in the pipelined mode whenever feasible. The preferred mode utilizes a three stage pipeline. The operation of this pipeline may be found in U.S. patent application Ser. No. 07/762,276, entitled "Data Coherency Protocol for Multi-Level Cached High Performance Multiprocessor System", referenced co-pending application which has been incorporated herein by reference. The remaining referenced components are as previously discussed.

Figure 8:
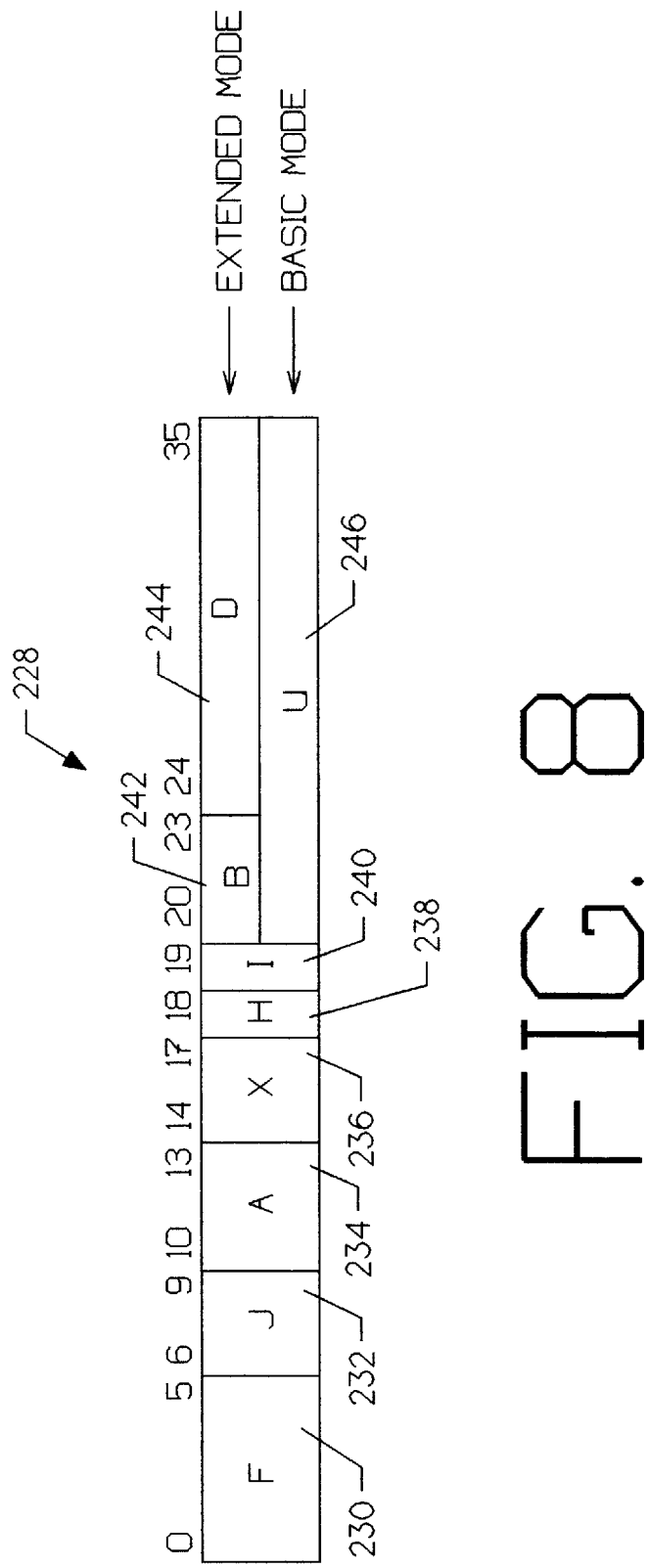
FIG. 8 shows the fields of a typical 36-bit machine instruction in both extended mode and basic mode format.

FIG. 8 shows the field format of a typical 36-bit machine instruction in both extended mode and basic mode format. The diagram is generally shown at 228. The F-field 230 or Function Code, including bits 0 through 5, specifies the operation to be performed by the instruction. The J-field 232, including bits 6 through 9, is sometimes combined with the F-field 230 to act as part of the Function Code, but usually represents an instruction operand qualifier indicating whether the instruction operand is the entire 36-bit word specified by the instruction operand address, a subfield of that word or the instruction operand address itself (immediate operand). The A-field 234, located at bits 10 through 13, is usually the register operand address specifying the address of the register containing the operand. However, for some instructions the A-field 234 acts as part of the Function Code 230. The X-field 236, at bits 14 through 17, is the index register (X-register) address specifying an index register to be used in the indexing operation to form the instruction operand address. The H-bit 238 at bit 18 is used to control index incrementation when the K-field of the instruction is non zero. The I-bit 240 at bit 19 indicates indirect addressing in basic mode unless the instruction specifies an immediate operand.

Generally, the "basic mode" denotes a basic set of machine instructions and capabilities, and "extended mode" denotes a set of machine instructions that includes the basic mode instructions plus a set of additional instructions, thereby providing extended operational capability. In extended mode, the I-bit 240 is used either as an extension to the B-field 242 or to indicate whether 18-bit or 24-bit relative addressing will be used. The B-field 242 at bits 20 through 23 in extended mode format is the base register selector which specifies a base register describing the bank containing the instruction operand. The displacement address in extended mode is specified by the D-field 244 (bits 24 through 35) and in basic mode by the U-field 246 (bits 20 through 35). Those fields contain a displacement value that is used in conjunction with the modifier portion of the index register specified by the X-field 236 to form an instruction operand relative address. A further discussion of the instruction format and the operation thereof can be found in the above-referenced U.S. patent application Ser. No. 07/762,282, entitled "Cooperative Hardware and Microcode Control System for Pipelined Instruction Execution".

Figure 9:
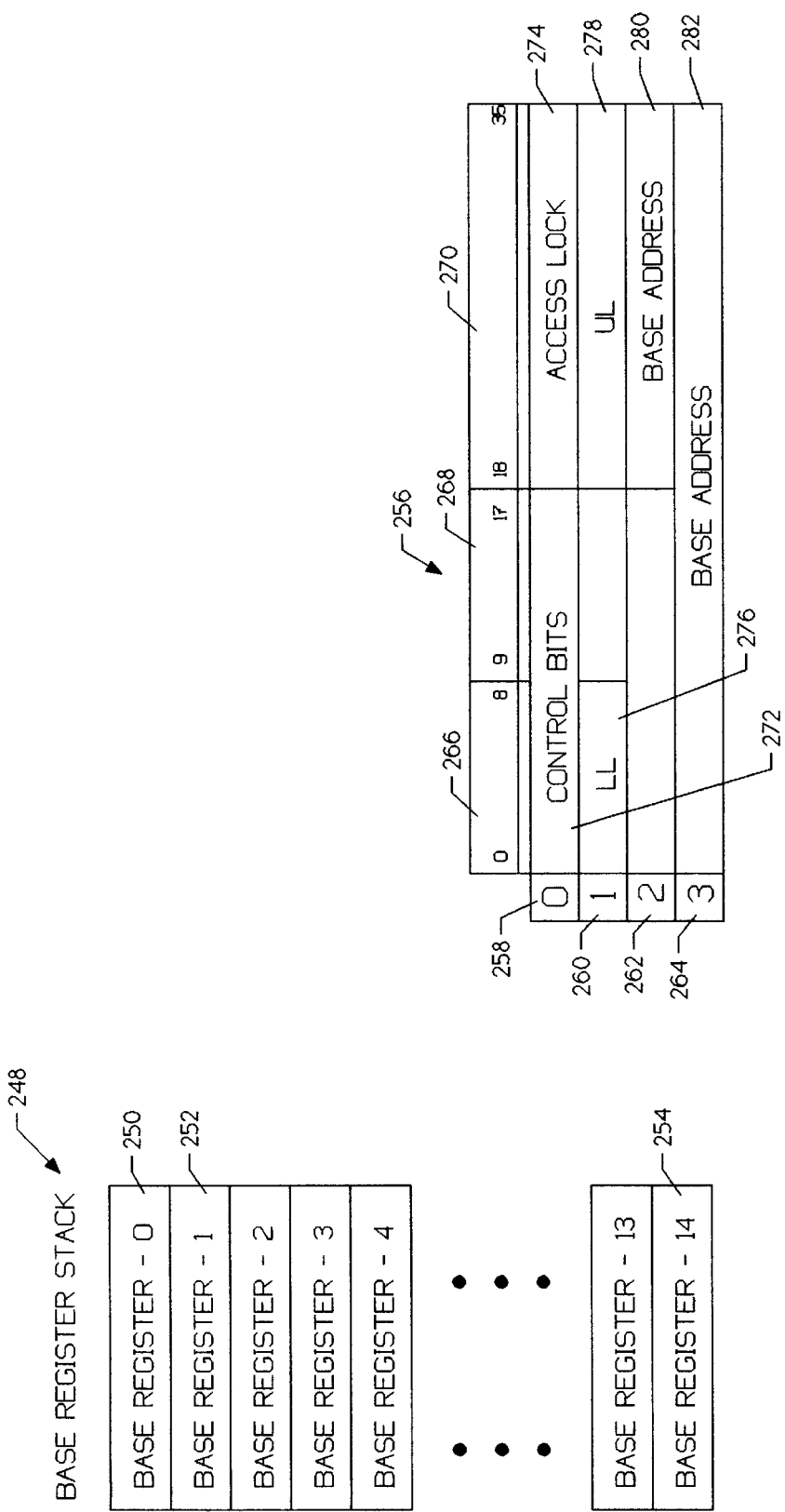
FIG. 9A shows an exemplary base register stack.
FIG. 9B shows a typical base register entry.

FIG. 9A shows an exemplary base register stack. The diagram is generally shown at 248. The base register stack comprises a number of addressable base registers 250, 252, and 254. In a preferred embodiment, base register stack 248 comprises 15 base registers as shown. During initialization of an applications program, a selected set of base registers are loaded with a number of fields including a base register address field.

The base register stack 248 is used to allocate memory to each application program running on the data processing system. This is accomplished by using a virtual addressing scheme, wherein each base register contains a base address which may be used to calculate an absolute address. A further discussion of absolute address generation may be found in the above-referenced U.S. patent application Ser. No. 07/762,282, filed Sep. 19, 1991, entitled "Cooperative Hardware and Microcode Control System for Pipelined Instruction Execution", which is incorporated herein by reference.

FIG. 9B shows the format for one entry 256 in one of the 15 user base registers. Each entry consists of four 36-bit words (i.e., words 258, 260, 262 and 264), wherein each word has lower quarter 266, second quarter 268, and upper half 270. Word 258 has a number of control bits 272 within lower quarter 266 and second quarter 268. Upper half 270 of word 258 contains access lock 274.

Lower limit 276 is located in lower quarter 266 of word 260. Upper limit 278 is located in upper half 270 of word 260. Upper limit 278 and lower limit 276 are used to set the security limits on user program access to the associated data segment.

The base address consists of portion 280 located in upper half 270 of word 262 and portion 282 located in the entire 36 bits of word 264. In this manner, an absolute storage space of 252 words of 36 bits each can be uniquely addressed by the absolute address.

Figure 10:
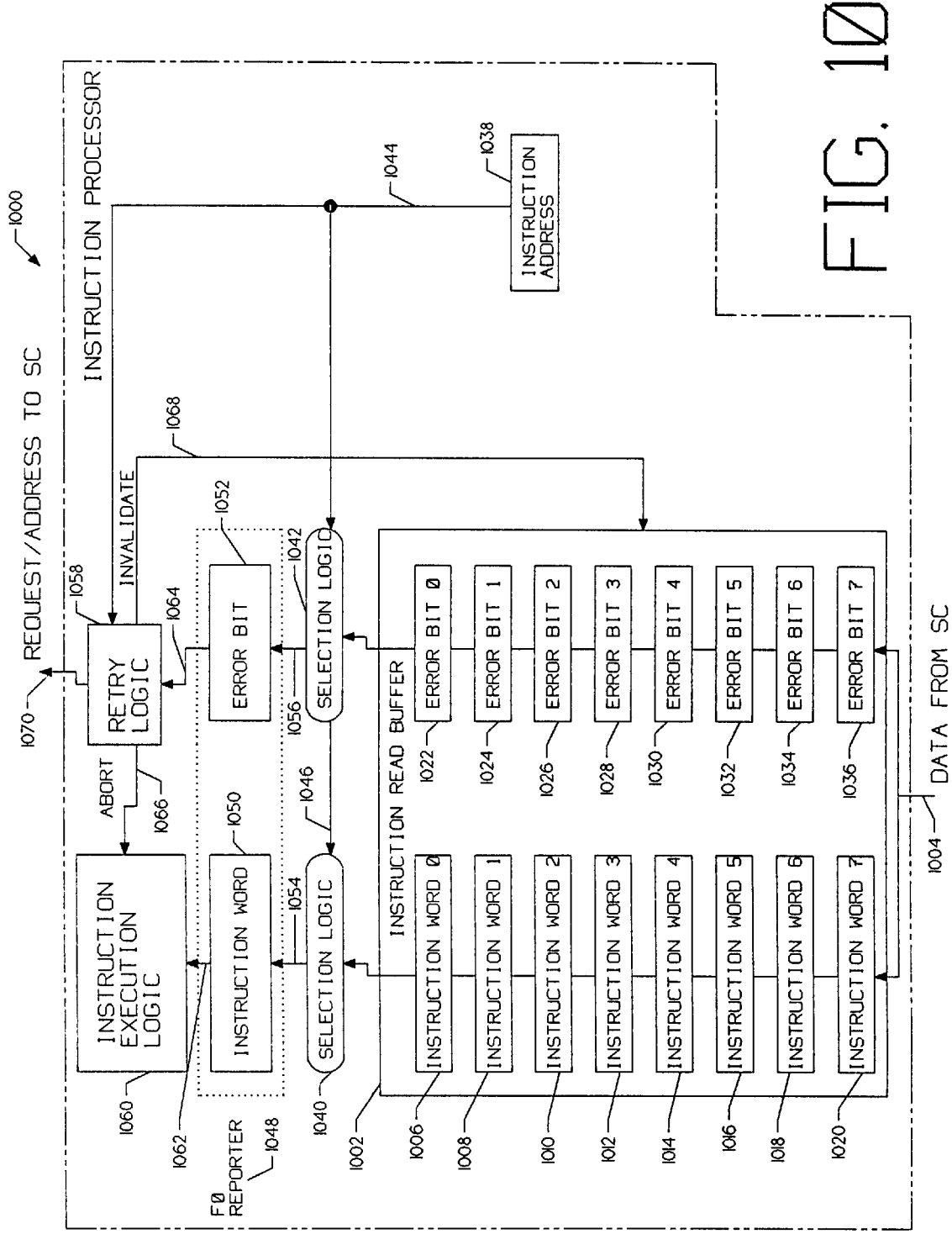
FIG. 10 is a simplified block diagram showing the major elements of the instruction retry request logic.

FIG. 10 is a simplified block diagram showing the major elements of the instruction retry request logic of instruction processor 22. The block diagram shown generally at 1000 executes an instruction read request to storage controller 12 if corrupted data is received by instruction processor 22. The instruction read request provided to storage controller 12 results in an eight word block of instructions and associated error bits being transferred back to instruction processor 22. Any of the eight words may contain an active error bit. The eight word block of instructions and associated error bits are provided to instruction read buffer 1002 from storage controller 12 via path 1004. Each of the eight words is stored in one of instruction word 0 1006, instruction word 1 1008, instruction word 2 1010, instruction word 3 1012, instruction 4 1014, instruction word 5 1016, instruction 6 1018, and instruction word 7 1020, and the associated error bits are stored respectively in error bit 0 1022, error bit 1 1024, error bit 2 1026, error bit 3 1028, error bit 4 1030, error bit 5 1032, error bit 6 1034 and error bit 7 1036. As instruction processor 22 sequentially executes instructions, instruction address 1038 is incremented resulting in selection of the desired instruction word and associated error bit from instruction read buffer 1002. Instruction address 1038 selects the desired instruction and associated error bit via selection logic 1040 and 1042 via paths 1044 and 1046. The desired word and associated error bit are latched into F0 register 1048. F0 register 1048 has instruction word register 1050 and error bit register 1052. Selection logic 1040 provides the desired word to instruction word register 1050 via path 1054. Selection logic 1042 provides the associated error bit to error bit register 1052 via path 1056. F0 register 1048 contains the instruction currently being started for execution.

When a data bit is first corrupted in one of the second level instruction cache memories, the corrupted data bit is returned to instruction processor 22 along with an active error bit indicating that the data is corrupted (see also, FIG. 3). If F0 register 1048 receives an active error bit, an indication is provided to retry logic 1058 that the current instruction in F0 register 1048 is corrupted and should not be executed. Instruction word register 1050 is coupled to instruction execution logic 1060 via path 1062. Error bit register 1052 is coupled to retry logic 1058 via path 1064. Instruction address 1038 provides the instruction address to retry logic 1058 via path 1044. Once the active error bit is provided to retry logic 1058 from error bit register 1052, retry logic 1058 sends an abort signal to instruction execution logic 1060 via path 1066 to stop execution of the corrupted instruction. The instruction is provided to instruction execution logic 1060 from instruction word register 1050 via path 1062. Retry logic 1058 provides an invalidate signal via path 1068 to instruction read buffer 1002 which clears all valid bits for all eight instructions contained within instruction read buffer 1002. This inhibits the transfer of the corrupted instructions from instruction read buffer 1002 to the first level instruction cache memory and inhibits any further use of this copy of the eight word block of instructions (see FIG. 6). Retry logic 1058 provides the instruction address corresponding to the corrupted instruction in F0 register 1048 to storage controller 12 along with an instruction read request via path 1070. This re-request must be delayed for a time sufficient to allow the corrupted location in the second level instruction cache memory to be degraded before the re-requested address is searched within the second level instruction tag memory (see also FIGS. 17–20). Once the second level instruction cache memory is degraded, the request results in a miss causing the second level instruction cache logic to request the instruction data from the memory storage units, either memory storage unit 32 or memory storage memory 24. Once the instruction data is returned from memory storage unit 32 or memory storage unit 34, the eight word block of instructions may be sent back to instructor processor 22 and reloaded into instruction read buffer 1002.

Figure 11:
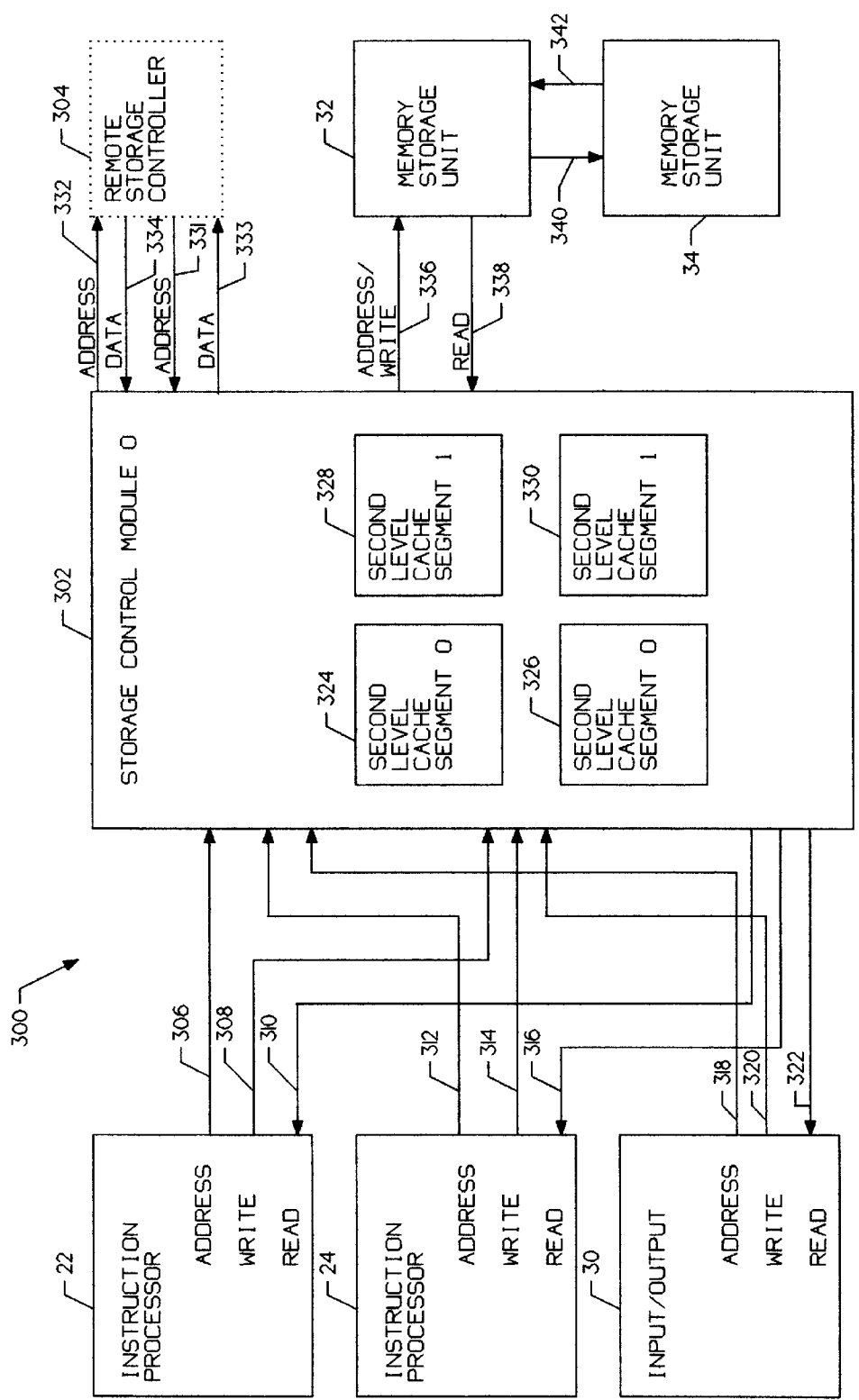
FIG. 11 is a block diagram showing the storage control module configuration for the entry-level (EC) configuration.

FIG. 11 is a block diagram showing the storage control module configuration for the entry-level (EC) configuration. The system block diagram shown at 300 is a 2× system, wherein the storage controller may expand as the size of the system expands to a 4× system, such as shown by the maximum level (MC) configuration (see also, FIG. 5). In the EC configuration, storage controller 12 has storage control module 0 302. Also included are instruction processor 22, instruction processor 24, input/output 30, memory storage unit 32, and memory storage unit 34. Storage control module 0 302 also couples to the remote storage controller shown at 304. Instruction processor 22 couples to storage control module 0 302 via address 306, write data path 308 and read data path 310. Instruction processor 24 couples to storage control module 0 302 via address 312, write data path 314 and read data path 316. Input/output 30 couples to storage control module 0 302 via address 318, write data path 320 and read data path 322. Storage control module 0 302 has second level cache segment 0 324, second level cache segment 0 326, second level cache 1 328 and second level cache segment 1 330. In this configuration, second level cache segment 0 88 as shown in FIG. 4 is split into two generic parts, second level cache segment 0 324 and second level cache segment 0 326, which operate together to form one functional second level cache segment 0 88. Similarly, second level cache segment 1 94 is split into second level cache segment 1 328 and second level cache segment 1 330. Storage control module 0 302 couples to remote storage controller 304 via paths 332, 334, 331, and 333. Path 332 is used by storage control module 0 302 to transmit address and control information to remote storage controller 304. Path 334 is used by storage control module 0 302 to receive previously requested read data or remote requester initiated write data from remote storage controller 304. Likewise, in the other direction, path 331 is used by storage control module 0 302 to receive address and control information from remote storage controller 304, and path 333 is used by storage control module 0 302 to transmit previously requested read data or requester initiated write data to remote storage controller 304. Storage control module 0 302 couples to memory storage unit 32 via address write path 336 and read path 338. Memory storage unit 32 couples to memory storage unit 34 via address write path 340 and read path 342. Second level cache segment 0 324 and second level cache segment 0 326 each cover one-half of the total address range. In addition, second level cache segment 1 328 and second level cache segment 1 330 each cover the other one-half of the address range. An address is provided to either second level cache segment 0 324 and second level cache segment 0 326, or to second level cache segment 1 328 and second level cache segment 1 330. The operation of the 2× system shown at 300 will be further described in reference to FIG. 13.

Figure 12:
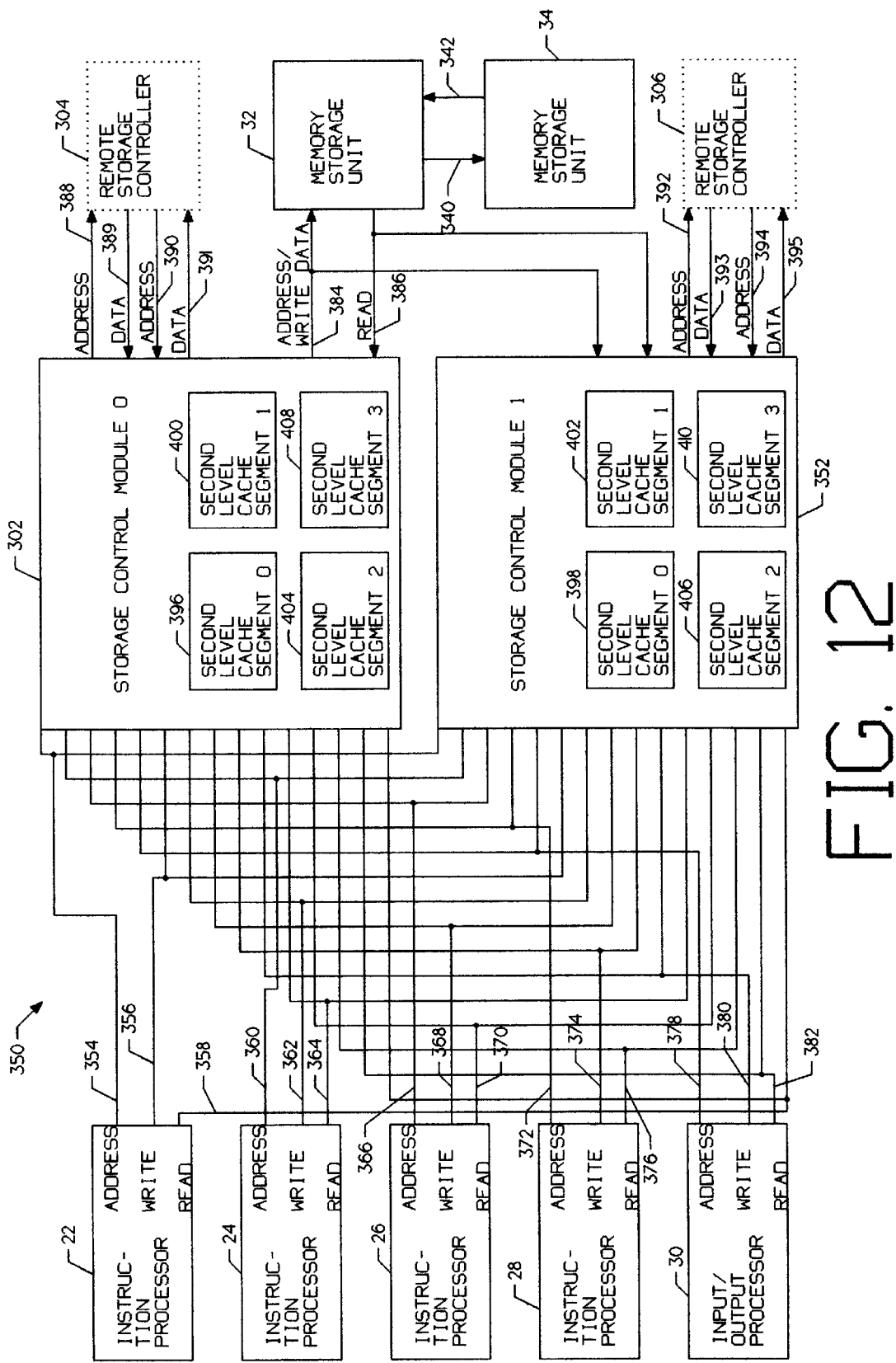
FIG. 12 is a block diagram showing the storage control module configuration for the maximum-level (MC) configuration.

FIG. 12 is a block diagram showing the storage control module configuration for the maximum level (MC) configuration. The MC configuration, also referred to as a 4× system, is shown generally at 350. This system is comprised of storage control module 0 302 and storage control module 1 352, and also has instruction processor 22, instruction processor 24, instruction processor 26, instruction processor 28, input/output 30, memory storage unit 32, and memory storage unit 34. Storage control module 0 302 may couple to a remote storage controller as shown at 304, and storage control module 1 352 may couple to a remote storage controller as shown at 306. Instruction processor 22 couples to storage control module 0 302 and storage control module 1 352 via address path 354, write data path 356 and read data path 358. Instruction processor 24 couples to storage control module 0 302 and storage control module 1 352 via address path 360, write data path 362 and read data path 364. Instruction processor 26 couples to storage control module 0 302 and storage control module 1 352 via address path 366, write data path 368, and read data path 370. Instruction processor 28 couples to storage control module 0 302 and storage control module 1 352 via address path 372, write data path 374 and read data path 376. Input/output 30 couples to storage control module 0 302 and storage control module 1 352 via address path 378, write data path 380 and read data path 382. Storage control module 0 302 and storage control module 1 352 both couple to memory storage unit 32 via address/write data path 384 and read data path 386. Memory storage unit 32 couples to memory storage unit 34 via address/write data path 340 and read data path 342. Storage control module 0 302 couples to remote storage controller 304 via paths 388, 389, 390, and 391. Path 388 is used by storage control module 0 302 to transmit address and control information associated with address ranges within segment 0 and segment 2 to remote storage controller 304. Path 389 is used by storage control module 0 302 to receive one-half of the previously requested read data or one-half of the remote requester initiated write data from remote storage controller 304, for all four segments 0–3. Likewise, in the other direction, path 390 is used by storage control module 0 302 to transmit one-half of the previously requested read data or one-half of local requester initiated write data to remote storage controller 304, for all four segments 0–3.

Storage control module 0 352 couples to remote storage controller 306 via paths 392, 393, 394, and 395. Path 392 is used by storage control module 0 352 to transmit address and control information associated with address ranges within segment 1 and segment 3 to remote storage controller 306. Path 393 is used by storage control module 0 352 to receive the other half of the previously requested read data or the other half of the remote requester initiated write data from remote storage controller 306, for all four segments 0–3. Likewise, in the other direction, path 394 is used by storage control module 0 352 to receive address and control information associated with address ranges within segment 1 and segment 3 from remote storage controller 306, and path 395 is used by storage control module 0 352 to transmit the other half of previously requested read data or the other half of local requester initiated write data to remote storage controller 306 for all four segments 0–3. In this configuration, shown generally at 350, storage control module 0 302 and storage control module 1 352 act together as a single storage controller with four independent second level cache segments and two times the second level cache memory capacity of the 2× system shown in FIG. 11. In the configuration shown generally at 350, each second level cache segment can be accessed simultaneously, thus maintaining the one-to-one ratio of second level cache "server" to instruction processor. Each second level cache segment covers one-fourth of the address range. Thus, second level cache segment 0 396 within storage control module 0 302 and second level cache segment 0 398 within storage control module 1 352 each cover one-fourth of the address range. Likewise, second level cache segment 1 400 and second level cache segment 1 402 each cover one-fourth of the address range, second level cache segment 2 404 and second level cache segment 2 406 each cover one-fourth of the address range, and second level cache segment 3 408 and second level cache segment 3 410 each cover one-fourth of the address range. In addition, storage control module 0 302 and storage control module 1 352 each control one-half of the write data and read data interface to instruction processor 22, instruction processor 24, instruction processor 26, instruction processor 28, input/output 30 or memory storage unit 32 and memory storage unit 34. The operation of the 4× system shown generally at 350 is further discussed in reference to FIGS. 14A and 14B.

Figure 13:
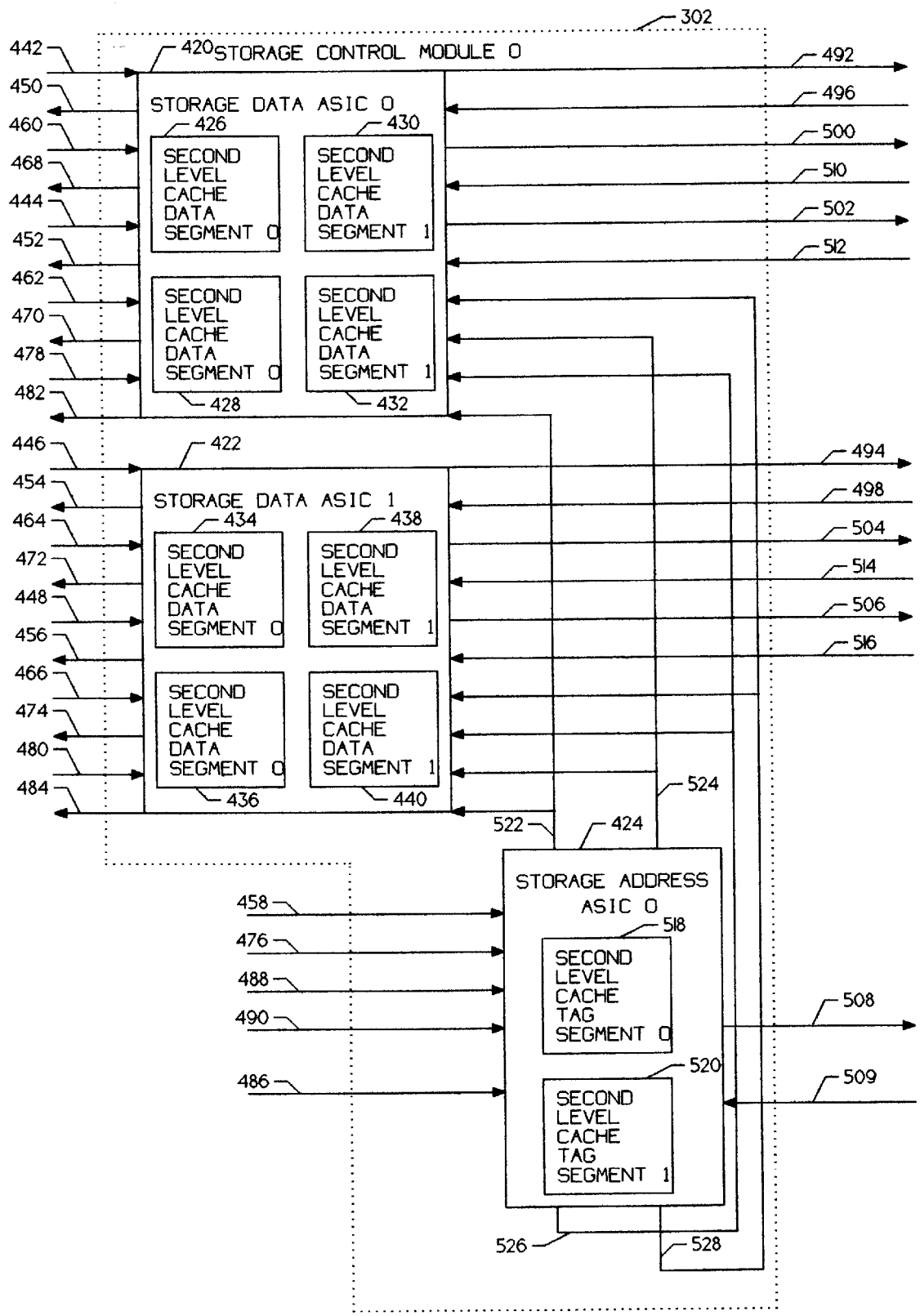
FIG. 13 is a block diagram showing the storage control module interconnect for the entry-level (EC) configuration.

FIG. 13 is a block diagram showing the storage control module interconnect for the entry-level (EC) configuration. The storage module interconnect shown is for a 2× system, and shows storage control module 0 302 as configured in FIG. 11. Storage control module 0 302 is comprised of three logic blocks, which may be implemented on application specific integrated circuits (ASICs). Storage data ASIC 0 420 and storage data ASIC 1 422 both have the same physical design, and both control the data logic and the data portion of the second level cache. Storage address ASIC 0 424 contains the second level cache tag memory and control logic. Storage data ASIC 0 420 contains second level cache data segment 0 426, second level cache data segment 0 428, second level cache data segment 1 430, and second level cache data segment 1 432. Storage data ASIC 1 422 contains second level cache data segment 0 434, second level cache data segment 0 436, second level cache data segment 1 438, and second level cache data segment 1 440. Second level cache data segment 0 426 and second level cache data segment 0 428 correspond to second level cache segment 0 324. Second level cache data segment 0 434 and second level data segment 0 436 correspond to second level cache segment 0 326. Second level cache data segment 1 430 and second level cache data segment 1 432 correspond to second level cache segment 1 328. Second level cache data segment 1 438 and second level cache data segment 1 440 correspond to second level cache segment 1 330. Second level cache segment 0 324, second level cache segment 0 326, second level cache segment 1 328, and second level cache segment 1 330 have been previously described (see also, FIG. 11). Storage data ASIC 0 420 and storage data ASIC 1 422 each comprise four quarter word write and read interfaces for instruction processor 22 or instruction processor 24, one-quarter word write and read interface for input/output 30, and two quarter word interfaces for remote read and write data to remote storage controller 304. Storage data ASIC 0 420 and storage data ASIC 1 422 also each comprise a one-quarter word combination write data and address interface to memory storage units 32 and 34, and a half word read data interface from memory storage units 32 and 34.

In the following discussion, instruction processor 22 corresponds to "IP 0" and instruction processor 24 corresponds to "IP 1". Input/output 30 corresponds to "I/O". "MSU" corresponds to memory storage unit 32 and memory storage unit 34, and "REM 0" corresponds to remote storage controller 304. Write data path 308 corresponds to IP 0 one-quarter word write data input paths 442, 444, 446 and 448. Input paths 442 and 444 couple to storage data ASIC 0 420. Input paths 446 and 448 couple to storage data ASIC 1 422. Read data path 310 corresponds to IP 0 one-quarter read data output paths 450, 452, 454 and 456. Paths 450 and 452 couple to storage data ASIC 0 420. Paths 454 and 456 couple to storage data ASIC 1 422. Address path 306 corresponds to IP 0 address/function input path 458. Path 458 couples to storage address ASIC 0 424. Write data path 314 corresponds to IP 1 one-quarter word write data input paths 460, 462, 464 and 466. Paths 460 and 462 couple to storage data ASIC 0 420. Paths 464 and 466 couple to storage data ASIC 1 422. Read data path 316 corresponds to IP 1 one-quarter word read data input paths 468, 470, 472 and 474. Paths 468 and 470 couple to storage data ASIC 0 420. Paths 472 and 474 couple to storage data ASIC 1 422. Address path 312 corresponds to IP 1 address/function input path 476. Path 476 couples to storage address ASIC 0 424. Address path 318 corresponds to I/O address/function input path 486. Path 486 couples to storage address ASIC 0 424. Write data path 320 corresponds to I/O one-quarter word write data input paths 478 and 480. Path 478 couples to storage data ASIC 0 420 and path 480 couples to storage data ASIC 1 422. Read data path 322 corresponds to I/O one-quarter word read data paths 482 and 484. Path 482 couples to storage data ASIC 0 420 and path 484 couples to storage data ASIC 1 422. IP 2 address function path 488 and IP 3 address function path 490, both of which couple to storage address ASIC 424, are not used in this configuration. Address/write data path 336 corresponds to MSU one-quarter word write data/ADR paths 492 and 494. Path 492 couples to storage data ASIC 420 and path 494 couples to storage data ASIC 422. Read data path 338 corresponds to MSU one-half word read data paths 496 and 498. Path 496 couples to storage data ASIC 420 and path 498 couples to storage data ASIC 422. Address path 332 corresponds to REM 0 address/function path 508. Path 508 couples from storage address ASIC 424. Data Path 334 corresponds to REM 0 one-quarter data paths 510, 512, 514, and 516. Path 510 and path 512 couple to storage data ASIC 420, and path 514 and path 516 couple to storage data ASIC 422. Address path 331 corresponds to REM 0 address/function path 509. Path 509 couples to storage address ASIC 424. Data Path 333 corresponds to REM 0 one-quarter data paths 500, 502, 504, and 506. Path 500 and path 502 couple from storage data ASIC 420, and path 504 and path 506 couple from storage data ASIC 422. Paths 492 and 494 are write data/address outputs. Paths 496, 510, 512, 498, 514 and 516 are data inputs. Paths 500, 502, 504 and 506 are data outputs. Path 508 is an address/function output. Path 509 is an address/function input. Address paths 306, 312 and 318, write data paths 308, 314, and 320, and read data paths 310, 316, 322, 334 and 338, and address write data paths 332 and 336 have been previously described (see also, FIG. 11). Storage address ASIC 0 424 further has second level cache tag segment 0 518 and second level cache tag segment 1 520. Storage data ASIC 0 424 is coupled to storage data ASIC 0 420 and storage data ASIC 1 422 via paths 522, 524, 526 and 528.

As the storage data ASIC 0 420, storage data ASIC 1 422 and storage address ASIC 424 may be configured in neither a 2× or 4× configuration (see also, FIGS. 14A and 14B), a maintenance system must statically scan in the configuration information to storage address ASIC 0 424 to indicate that the 2× configuration as shown in FIG. 13 is desired. The configuration information may include an interleave mode and an identification number, and may define which particular one of a plurality of segments corresponds to a particular range of a plurality of address locations. Thus, when storage address ASIC 0 424 receives a request and address from a requestor, such as instruction processor 22, instruction processor 24, input/output 30 or remote storage controller 304, the second level cache segment being requested will be determined. The second level cache tag segment 0 518 will be accessed if segment 0 is being requested, or second level cache tag segment 1 520 will be accessed if segment 1 is being requested. At the same time that either second level cache tag segment 0 518 or second level cache tag segment 1 520 are being accessed, storage address ASIC 0 424 outputs both address and control information to storage data ASIC 0 420 and storage data ASIC 1 422 via paths 522, 524, 526 and 528. Path 522 controls second level cache data segment 0 426 within storage data ASIC 0 420 and second level cache data segment 0 434 within storage data ASIC 1 422. Path 524 controls second level cache data segment 0 428 within storage data ASIC 0 420 and second level cache data segment 0 436 within storage data ASIC 1 422. Path 526 controls second level cache data segment 1 430 within storage data ASIC 0 420 and second level cache data segment 1 438 within storage data ASIC 1 422. Path 528 controls second level cache data segment 1 432 within storage data ASIC 0 420 and second level cache data segment 1 440 within storage data ASIC 1 422. Since paths 522 and 524 carry the same address and control information, second level cache data segment 0 blocks 426, 428, 434 and 436 will be accessed simultaneously and act in tandem as a single, second level cache segment. Alternatively, since paths 526 and 528 carry the same address and control information, second level cache data segment 1 blocks 430, 432, 438 and 440, will be accessed simultaneously and act in tandem as a single, second level cache segment. Paths 522 and 524, as well as paths 526 and 528, carry route code information to indicate to each second level cache data segment block which interface to use for write operations and which interface to use for read operations. Thus, if instruction processor 22 was to read information from second level cache data segment 0, then storage control ASIC 0 424 would send the addressing control information to storage data ASIC 0 420 and storage data ASIC 1 422 via paths 522 and 524. Second level cache data segment 0 426, 428, 434 and 436 would be accessed. The route information sent via path 522 would indicate to storage data ASIC 0 420 and storage data ASIC 1 422 to route its associated data segment block, second level cache data segment 0 426 and second level cache data segment 0 434 to half of the interface for instruction processor 22, which are read data interfaces 450 and 454. The route information sent via path 524 would indicate to storage data ASIC 0 420 and storage data ASIC 1 422 to route its associated data segment block, second level cache data segment 0 428 and second level cache data segment 0 436 to the other half of the interface to instruction processor 22, which are read data interfaces 452 and 456. As a result, a one word read data interface is provided by paths 450 and 454 via respectively second level cache data segment 0 426 and second level cache data segment 0 434, and by paths 452 and 456 via second level cache data segment 0 428 and second level cache data segment 0 436. Each of these one-quarter word read interfaces are combined to form the one word interface.

Figure 14A:
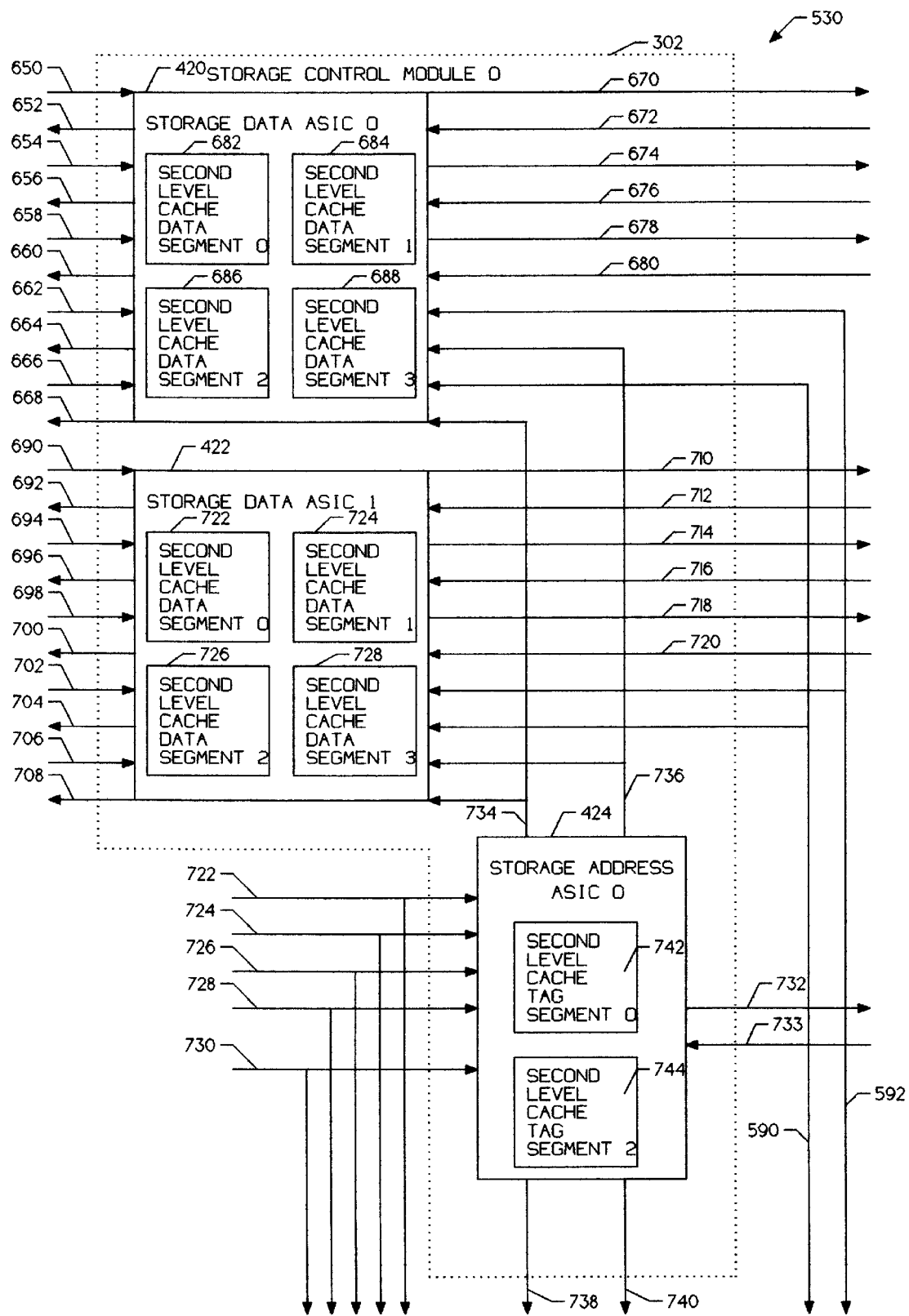
FIGS. 14A and 14B is a block diagram showing the storage control module interconnect for the maximum-level (MC) configuration.
Figure 14B:
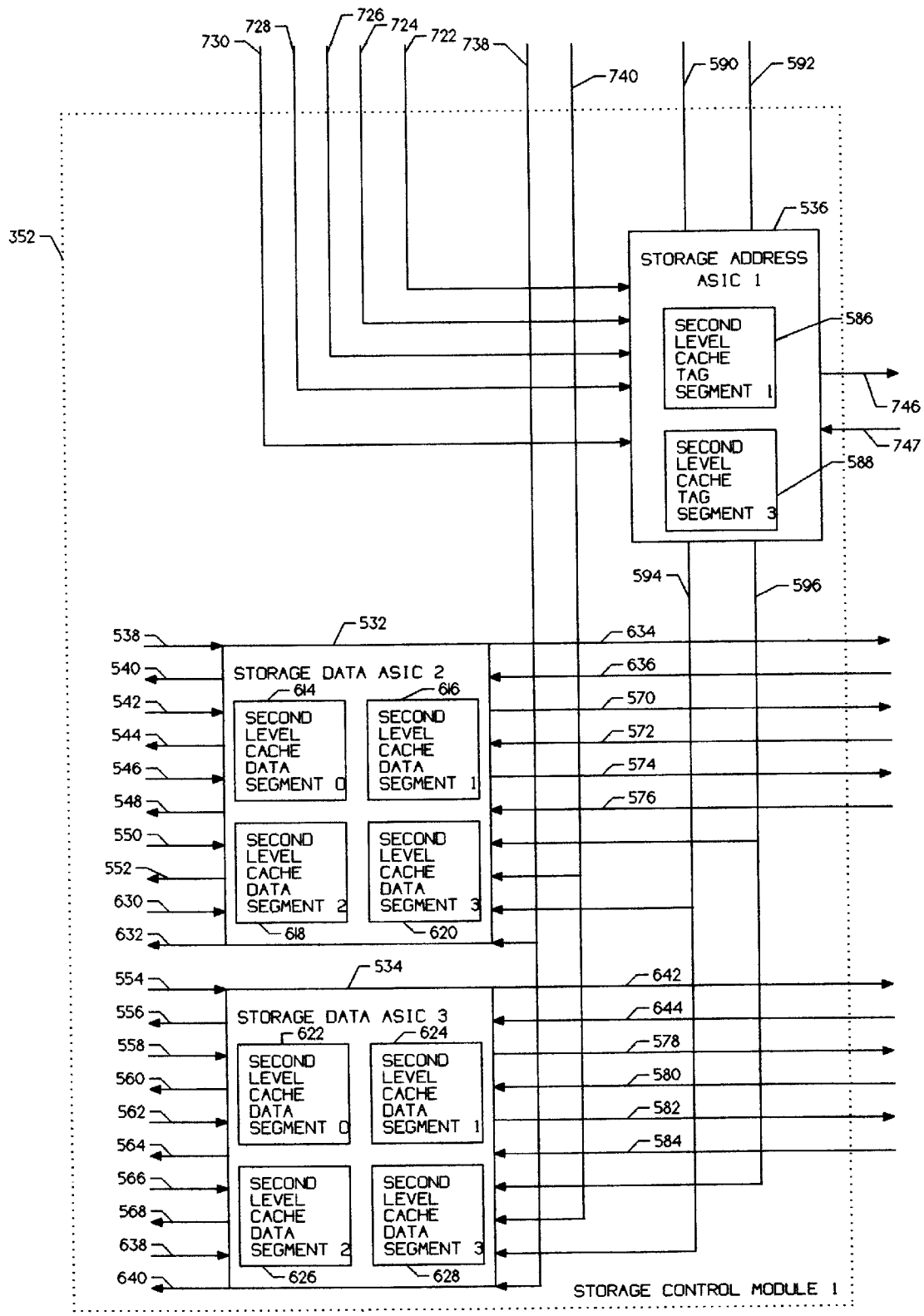

FIGS. 14A and 14B is a block diagram showing the storage control module interconnect for the maximum-level (MC) configuration. The 4× interconnection corresponding with the MC configuration is shown generally at 530 and consists of storage control module 0 302 and storage control module 1 352 (see also, FIG. 12). Storage control module 0 302 has storage data ASIC 0 420, storage data ASIC 1 422 and storage address ASIC 0 424 (see also, FIG. 13). Storage data ASIC 0 420 and storage data ASIC 1 422 have the same physical design as shown in FIG. 13, but have different pin assignments for the MC configuration. Storage control module 1 352 has storage data ASIC 2 532, storage data ASIC 3 534 and storage address ASIC 1 536. Storage data ASIC 2 532 and storage data ASIC 3 534 have the same physical design as storage data ASIC 0 420 and storage data ASIC 1 422. Storage address ASIC 0 424 and storage address ASIC 1 536 also have the same physical design. Storage data ASIC 0 420 has second level cache data segment 0 682, second level cache data segment 1 684, second level cache data segment 2 686, and second level cache data segment 3 688. Storage data ASIC 1 422 has second level cache data segment 0 722, second level cache data segment 1 724, second level cache data segment 2 726, and second level cache data segment 3 728. Storage data ASIC 2 532 has second level cache data segment 0 614, second level cache data segment 1 616, second level cache data segment 2 618, and second level cache data segment 3 620. Storage data ASIC 3 534 has second level cache data segment 0 622, second level cache data segment 1 624, second level cache data segment 2 626, and second level cache data segment 3 628. Storage address ASIC 0 424 further has second level cache tag segment 0 742 and second level cache tag segment 2 744. Storage address ASIC 1 536 further has second level cache tag segment 1 586 and second level cache tag segment 3 588.

In the preferred embodiment, second level cache data segment 0 682 and second level cache data segment 0 722 correspond to second level cache segment 0 396. Second level cache data segment 1 684 and second level cache data segment 1 724 correspond to second level cache segment 1 400. Second level cache data segment 2 688 and second level cache data segment 2 726 correspond to second level cache segment 2 404. Second level cache data segment 3 688 and second level cache data segment 3 728 correspond to second level cache segment 3 408. Second level cache data segment 0 614 and second level cache data segment 0 622 correspond to second level cache segment 0 398. Second level cache data segment 1 616 and second level cache data segment 1 624 correspond to second level cache segment 1 402. Second level cache data segment 2 618 and second level cache data segment 2 626 correspond to second level cache segment 2 406. Second level cache data segment 3 620 and second level cache data segment 3 628 correspond to second level cache segment 3 410. Second level cache segment 0 396, second level cache segment 1 400, second level cache segment 2 404, and second level cache segment 3 408, as well as second level cache segment 0 398, second level cache segment 1 402, second level cache segment 2 406, and second level cache segment 3 410 have been previously described (see also, FIG. 12). Storage data ASIC 0 420, storage data ASIC 1 422, storage data ASIC 2 532, and storage data ASIC 1 534 each comprise four quarter word write and read interfaces for instruction processor 22, instruction processor 24, instruction processor 26, or instruction processor 28, one-quarter word write and read interface for input/output 30, and two quarter word interfaces for each of remote read and write data to remote storage controllers 304 and 306. Storage data ASIC 0 420, storage data ASIC 1 422, storage data ASIC 2 532, and storage data ASIC 1 534 each also comprise a one-quarter word combination write data and address interface to memory storage units 32 and 34, and a half word read data interface from memory storage units 32 and 34.

In the following discussion, instruction processor 22 corresponds to "IP 0", instruction processor 24 corresponds to "IP 1", instruction processor 26 corresponds to "IP 2", instruction processor 28 corresponds to "IP 3", input/output processor 30 corresponds to "I/O", memory storage unit 32 and memory storage unit 34 correspond to "MSU", remote storage controller 304 corresponds to "REM 0", and remote storage controller 306 corresponds to "REM 1". Referring to FIG. 12, address path 354 corresponds to IP 0 address/function input path 722. Path 722 couples to storage address ASIC 0 424 and storage address ASIC 1 536. Write data path 356 corresponds to IP 0 one-quarter word write data input paths 650, 690, 538 and 554. Input paths 650, 690, 538 and 554 couple respectively to storage data ASIC 0 420, storage data ASIC 1 422, storage data ASIC 2 532, and storage data ASIC 3 534. Read data path 358 corresponds to IP 0 one-quarter read data output paths 652, 692, 540 and 556. Output paths 652, 692, 540 and 556 couple respectively from storage data ASIC 0 420, storage data ASIC 1 422, storage data ASIC 2 532, and storage data ASIC 3 534. Address path 360 corresponds to IP 1 address/function input path 724. Path 724 couples to storage address ASIC 0 424 and storage address ASIC 1 536. Write data path 362 corresponds to IP 1 one-quarter word write data input paths 654, 694, 542 and 558. Input paths 654, 694, 542 and 558 couple respectively to storage data ASIC 0 420, storage data ASIC 1 422, storage data ASIC 2 532, and storage data ASIC 3 534. Read data path 364 corresponds to IP 1 one-quarter read data output paths 656, 696, 544 and 560. Output paths 656, 696, 544 and 560 couple respectively from storage data ASIC 0 420, storage data ASIC 1 422, storage data ASIC 2 532, and storage data ASIC 3 534. Address path 366 corresponds to IP 2 address/function input path 726. Path 726 couples to storage address ASIC 0 424 and storage address ASIC 1 536. Write data path 368 corresponds to IP 2 one-quarter word write data input paths 658, 698, 546 and 562. Input paths 658, 698, 546 and 562 couple respectively to storage data ASIC 0 420, storage data ASIC 1 422, storage data ASIC 2 532, and storage data ASIC 3 534. Read data path 370 corresponds to IP 2 one-quarter read data output paths 660, 700, 548 and 564. Output paths 660, 700, 548 and 564 couple respectively from storage data ASIC 0 420, storage data ASIC 1 422, storage data ASIC 2 532, and storage data ASIC 3 534. Address path 372 corresponds to IP 3 address/function input path 728. Path 728 couples to storage address ASIC 0 424 and storage address ASIC 1 536. Write data path 374 corresponds to IP 3 one-quarter word write data input paths 662, 702, 550 and 566. Input paths 662, 702, 550 and 566 couple respectively to storage data ASIC 0 420, storage data ASIC 1 422, storage data ASIC 2 532, and storage data ASIC 3 534. Read data path 376 corresponds to IP 3 one-quarter read data output paths 664, 704, 552 and 568. Output paths 664, 704, 552 and 568 couple respectively from storage data ASIC 0 420, storage data ASIC 1 422, storage data ASIC 2 532, and storage data ASIC 3 534. Address/write data path 384 corresponds to MSU one-quarter word write data/address paths 670, 710, 634 and 642. Output paths 670, 710, 634 and 642 couple respectively from storage data ASIC 0 420, storage data ASIC 1 422, storage data ASIC 2 532, and storage data ASIC 3 534. Read data path 386 corresponds to MSU one-half word read data paths 672, 712, 636 and 644. Input paths 672, 712, 636 and 644 couple respectively to storage data ASIC 0 420, storage data ASIC 1 422, storage data ASIC 2 532, and storage data ASIC 3 534.

Address path 388 corresponds to REM 0 address/function path 732. Path 732 couples from storage address ASIC 424. Data Path 389 corresponds to REM 0 one-quarter data paths 676, 680, 716, and 720. Path 676 and path 680 couple to storage data ASIC 420, and path 716 and path 720 couple to storage data ASIC 422. Address path 390 corresponds to REM 0 address/function path 733. Path 733 couples to storage address ASIC 424. Data Path 391 corresponds to REM 0 one-quarter data paths 674, 678, 714, and 718. Path 674 and path 678 couple from storage data ASIC 420, and path 714 and path 718 couple from storage data ASIC 422.

Address path 392 corresponds to REM 1 address/function path 746. Path 746 couples from storage address ASIC 536. Data Path 393 corresponds to REM 1 one-quarter data paths 572, 576, 580, and 584. Path 572 and path 576 couple to storage data ASIC 532, and path 580 and path 584 couple to storage data ASIC 534. Address path 394 corresponds to REM 1 address/function path 747. Path 747 couples to storage address ASIC 536. Data Path 395 corresponds to REM 1 one-quarter data paths 570, 574, 578, and 582. Path 570 and path 574 couple from storage data ASIC 532, and path 578 and path 582 couple from storage data ASIC 534.

A maintenance system statically scans in configuration information into storage data ASIC 0 420, storage data ASIC 1 422, storage data ASIC 2 532, storage data ASIC 3 534, storage address ASIC 0 424 and storage address ASIC 1 536. This configuration information designates that a 4× interconnect is going to be used. An identifying tag included in the configuration information allows storage data ASIC 0 420, storage data ASIC 1 422, storage data ASIC 2 532, storage data ASIC 3 534, storage address ASIC 0 424 and storage address ASIC 1 536 to determine which address range to respond to. Once storage address ASIC 0 424 and storage address ASIC 1 536 receive a request from instruction processors 22, 24, 26 or 28 or input/output processor 30, the segment being requested is determined so that the appropriate second level cache tag may be accessed. Storage address ASIC 0 424 has second level cache tag segment 0 742 and second level cache tag segment 2 744. Storage address ASIC 1 536 has second level cache tag segment 1 586 and second level cache tag segment 3 588. Storage address ASIC 0 424 (in the case of segment 0 or segment 2 being requested) or storage address ASIC 1 536 (in the case of segment 1 or segment 3 being requested) will drive the exact same information on both sets of control lines to storage data ASIC 0 420, storage data ASIC 1 422, storage data ASIC 2 532, and storage data ASIC 3 534. These interfaces include paths 734, 736, 738 and 740 for storage address ASIC 0 424, and paths 590, 592, 594 and 596 for storage data ASIC 1 536. Paths 734, 736, 590 and 592 couple to both storage data ASIC 0 420 and storage data ASIC 1 422. Paths 738, 740, 594 and 596 couple to both storage data ASIC 2 532 and storage data ASIC 3 534. Both storage address ASIC 0 424 and storage address ASIC 1 536 receive a request and address via paths 722, 724, 726, 728 or 730 from, respectively, instruction processor 22, instruction processor 24, instruction processor 26, instruction processor 28 or input/output processor 30. Storage address ASIC 0 424 and storage address ASIC 1 536 determine which of segments 1 through 4 is being requested. The appropriate one of either storage address ASIC 0 424 (if segment 0 or segment 2 is requested) or storage address ASIC 1 536 (if segment 1 or segment 3 is requested) will access the second level cache tag based on the requested segment. Storage address ASIC 0 424 accesses second level tag segment 0 742 if segment 0 is being requested, or accesses second level tag segment 2 744 if segment 2 is being requested. Storage address ASIC 1 536 accesses second level cache tag segment 1 586 if segment 1 is being requested, or accesses second level cache tag segment 3 588 if segment 3 is being requested. These address function and control lines are then presented to storage data ASIC 0 420, storage data ASIC 1 422, storage data ASIC 2 532 and storage data ASIC 3 534 via the paths as discussed above from storage data ASIC 0 424 and storage data ASIC 1 536. Thus, for example, if the function is a read request from instruction processor 22 (IP 0), the request is presented via path 722 to storage address ASIC 0 424 and storage address ASIC 1 536. If the request is to an address within segment 0, second level cache tag segment 0 742 is accessed to determine if the data is available within the second level cache. The address is presented to storage data ASIC 0 420 and storage data ASIC 1 422 via the coupling of path 734 to storage data ASIC 2 532 and storage data ASIC 3 534 via the coupling of path 738. The address is presented to second level cache data segment 0 682 within storage data ASIC 0 420, second level cache data segment 0 722 within storage data ASIC 1 422, second level cache data segment 0 614 within storage data ASIC 2 532, and second level cache 0 622 within storage data ASIC 3 534. During a read, storage data ASIC 0 420, storage data ASIC 1 422, storage data ASIC 2 532 and storage data ASIC 3 534 may each provide one-quarter word for each clock cycle. Second level cache data segment 0 682 outputs a first quarter of word read data on output 652, second level cache data segment 0 722 outputs a second quarter word read data on output path 692, second level cache data segment 0 614 outputs a third quarter of word read data on output path 540, and second level cache data segment 0 622 outputs a fourth quarter of word read data on output path 556. A total of one word is output since storage data ASIC 0 420, storage data ASIC 1 422, storage data ASIC 2 532 and storage data ASIC 3 534 each output one-quarter of the word read data. Thus, in comparison to the 2× configuration shown in FIG. 13, the performance of the input/output has effectively scaled with the addition of storage data ASIC 2 532 and storage data ASIC 3 534 as four rather than two storage data ASICs now output the word read data. The performance of the input/output similarly scales when a write is performed. That is, the write data interfaces of storage data ASIC 0 420, storage data ASIC 1 422, storage data ASIC 2 532 and storage data ASIC 3 534 scale in comparison to the 2× configuration shown in FIG. 13.

Each storage data ASIC may output one-quarter word of write data or address to MSU, and may input one-half word of read data from MSU. Storage data ASIC 0 420 may output one-quarter word of write data or address to MSU via path 670, and may input one-half word of read data via path 672. Storage data ASIC 1 422 may output one-quarter word of write data or address to MSU via path 710, and may input one-half word of read data via path 712. Storage data ASIC 2 532 may output one-quarter word of write data or address to MSU via path 634, and may input one-half word of read data via path 636. Storage data ASIC 3 534 may output one-quarter word of write data or address to MSU via path 642, and may input one-half word of read data via path 644. Storage data ASIC 0 420 may output two one-quarter words of write data to REM 0 via paths 674 or 678 respectively, or may input two one-quarter words of read data from REM 0 via paths 676 or 680 respectively. Storage data ASIC 1 422 may output two one-quarter words of write data to REM 0 via paths 714 or 718 respectively, or may input two one-quarter words of read data from REM 0 via paths 716 or 720 respectively. Storage data ASIC 2 532 may output two one-quarter words of write data to REM 1 via paths 570 or 574 respectively, or may input two one-quarter words of read data from REM 1 via paths 572 or 576 respectively. Storage data ASIC 3 534 may output two one-quarter words of write data to REM 1 via paths 578 or 582 respectively, or may input two one-quarter words of read data from REM 1 via paths 580 or 584 respectively. Paths 674, 676, 714, 716, 570, 572, 578, and 580 are associated with data from segment 0 or segment 2. Paths 678, 680, 718, 720, 574, 576, 582, and 584 are associated with data from segment 1 or segment 3. Storage address ASIC 0 424 may output an address or function to REM 0 via path 732. Storage address ASIC 0 424 may input an address or function from REM 0 via path 733. Storage address ASIC 1 536 may output an address or function to REM 1 via path 746. Storage address ASIC 1 536 may input an address or function from REM 1 via path 747.

FIG. 15 is a diagram showing the instruction processor to storage controller address format. The instruction processor to storage controller address format is shown generally at 800 and describes the two cycle time multiplexed function/address signal input which may be presented to the IP 0 function/address input via path 722, the IP 1 function/address input via path 724, the IP 2 function/address input via path 726, the IP 3 function/address input via path 728, or the I/O function/address input via path 730. The address format is divided into a first cycle shown generally at 802 and a second cycle shown generally at 804. F0 through F6 are function codes for the particular operation being performed which include read and write operations. For the MC configuration with four-way interleave, address bits A21–A36 may comprise a block address, address bits A37–A46 may comprise an instruction cache set address, and address bits A39–A48 may comprise an operand cache set address. For the MC configuration without interleave, address bits A21–A26 and A29–A38 may comprise a block address, address bits A39–A48 may comprise an instruction cache set address, and address bits A41–A50 may comprise an operand cache set address. For the EC configuration with two-way interleave, address bits A21–A37 may comprise a block address, address bits A38–A47 may comprise an instruction cache set address, and address bits A40–A49 may comprise an operand cache set address. For the EC configuration without interleave, address bits A21–A26 and A28–A38 may comprise a block address, address bits A39–A48 may comprise an instruction cache set address, and address bits A41–A50 may comprise an operand cache set address. The definition of the address bits A21 through A53 may be found in U.S. patent application Ser. No. 08/748,772, entitled "Selectable Two-Way, Four-Way Double Cache Interleave Scheme" referenced co-pending application which has been incorporated herein by reference.

Figure 16:
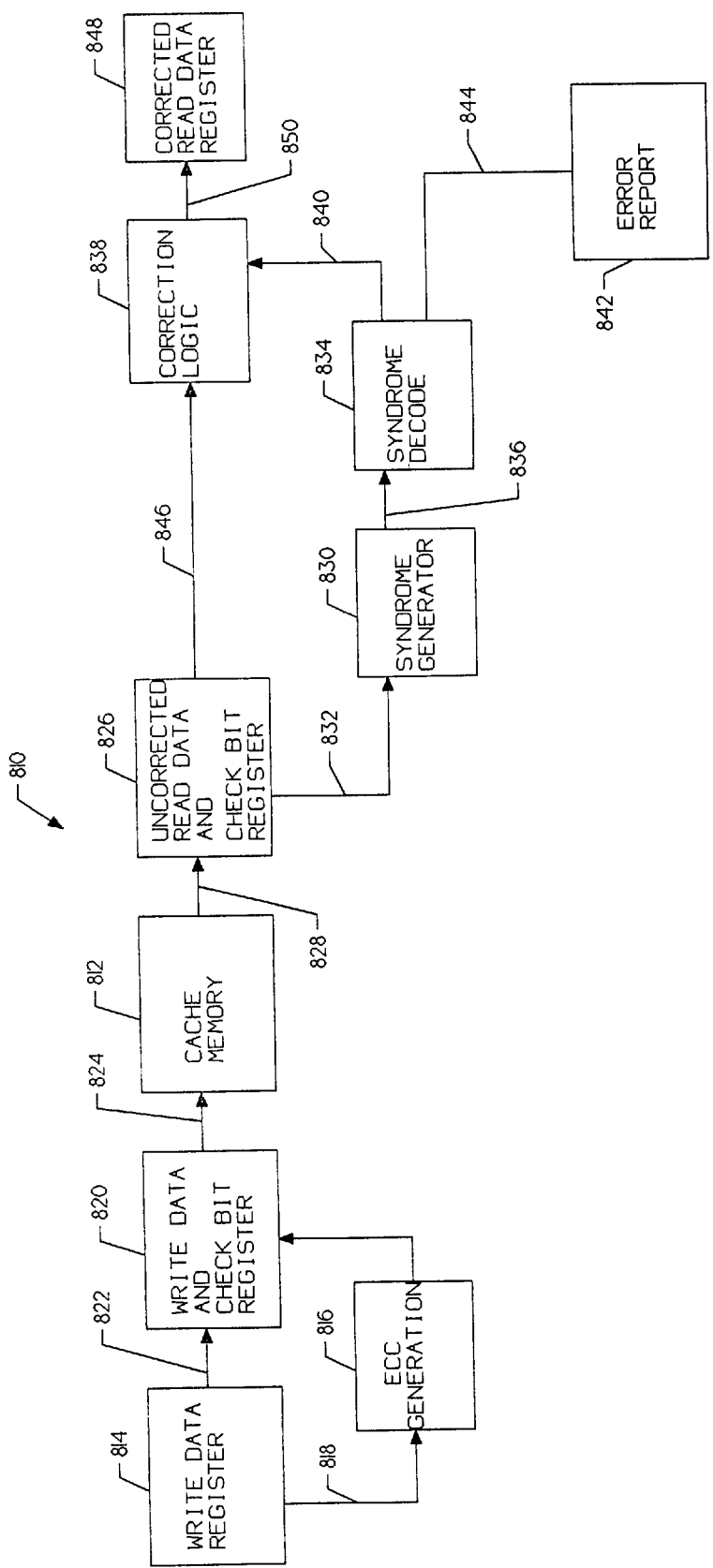
FIG. 16 is a block diagram showing a prior art error detect and correct scheme.

FIG. 16 is a block diagram showing a prior art error detect and correct scheme. The prior art error detect and correct scheme is shown generally at 810. Data to be written into cache memory 812 is initially stored in write data register 814. Write data register 814 is coupled to ECC generation 816 via path 818, and to write data and check bit register 820 via path 822. Data to be written from write data register 814 is provided to both write data and check bit register 820 and ECC generation 816. ECC generation 816 generates extra check bits which are stored along side the data within write data and check bit register 820. These extra check bits, along with the data bits stored in write data and check bit register 820, form a code, all of whose values have a hamming distance of at least 3 for single-bit error correction. Generation of these check bits from ECC generation 816 takes one clock cycle which occurs just prior to the cache memory being written. Write data and check bit register 820 provides the data and check bits to cache memory 812 via path 824.

During a read operation, the data and check bits are read from cache memory 812 and stored in uncorrected read data and check bit register 826 via path 828. When the data and check bits are stored in uncorrected read data and check bit register 826, the cache memory 812 can operate in a pipeline mode so that subsequent accesses of cache memory 812 can occur while the current access is being processed through the correction logic. The data and check bits stored in uncorrected read data and check bit register 826 are first provided to syndrome generator 830 via path 832. Syndrome generator 830 regenerates the check bits based on the read data and compares the regenerated check bits with the stored check bits from uncorrected read data and check bit register 826. The result of the comparison is a syndrome, whose value is equal to zero if no single-bit fault has occurred. The syndrome value is not equal to zero if a single-bit fault has occurred. Syndrome generator 830 provides the syndrome to syndrome decode 834 via path 836. Syndrome decode 834 creates a master bit vector which is output to correction logic 838 via path 840. Syndrome decode 834 also provides error report 842 via path 844. Error report 842 is optionally sent to a requester or a maintenance processor. Uncorrected read data and check bit register 826 provides the data and check bits to correction logic 838 via path 846. After correction logic 838 has received the master bit vector from syndrome decode 834 via path 840, and the data and check bits from uncorrected read data and check bit register 826 via path 846, correction logic 838 toggles the single bit which was detected as being in error to a correct state. The corrected data is provided to corrected read data register 848 via path 850. If syndrome generator 830 has determined that no error exists within the read data provided via path 832, correction logic 838 does not toggle any read data bits provided from uncorrected read data and check bit register 826 via path 846 as the syndrome value is equal to zero. The additional clock cycle required for correction logic 838 to decode the master bit vector from syndrome decode 834 via path 840 is required whether or not the read data provided from uncorrected read data and check bit register 826 needs to be corrected.

Figure 17:
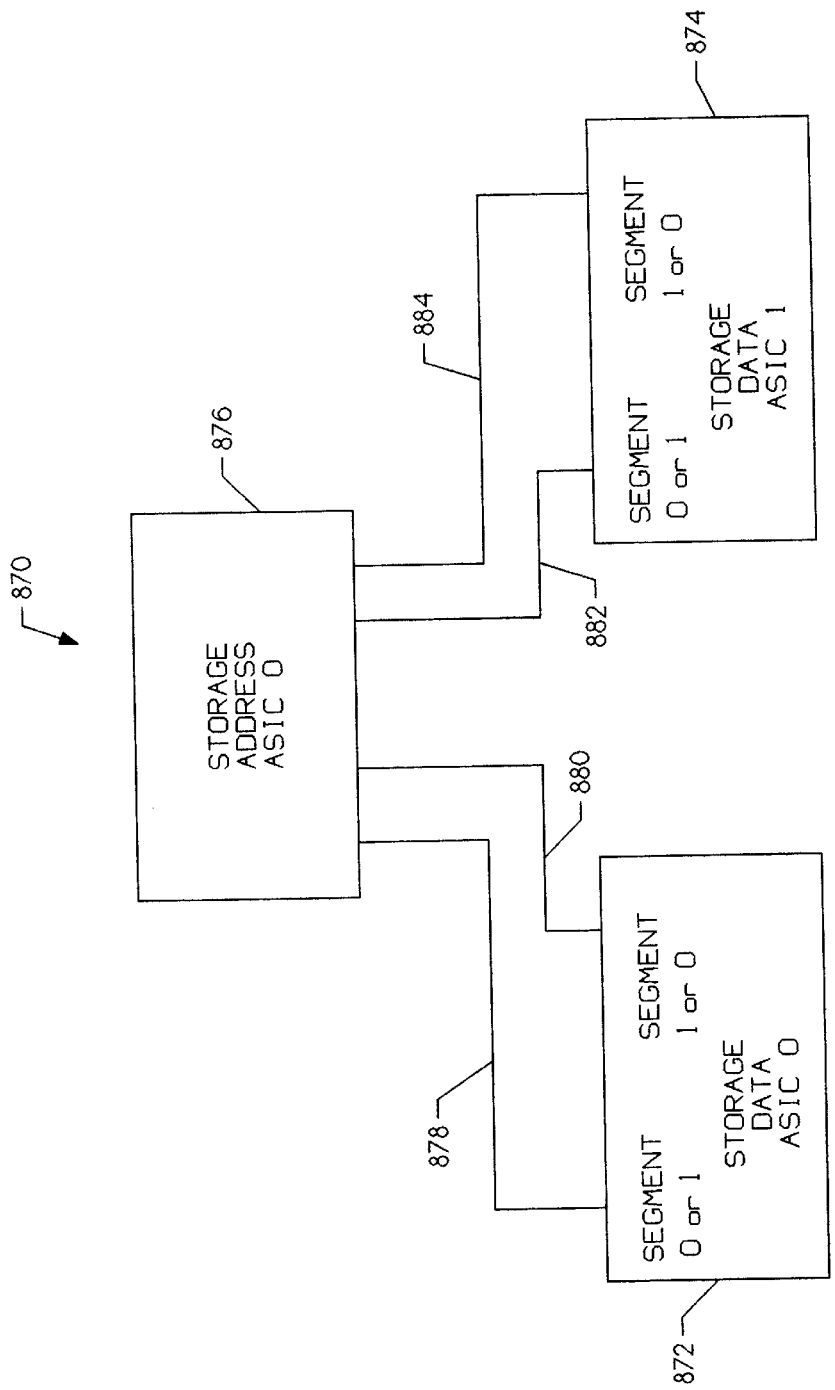
FIG. 17 is a block diagram showing the parity error pin configuration for the entry-level (EC) configuration.

FIG. 17 is a block diagram showing the parity error pin configuration for the entry-level (EC) configuration. This parity error pin configuration is shown generally at 870 and includes storage data ASIC 0 872, storage data ASIC 1 874 and storage address ASIC 0 876. Storage data ASIC 0 872, storage data ASIC 1 874 and storage address ASIC 0 876 may correspond with storage data ASIC 0 420, storage data ASIC 1 422 and storage address ASIC 0 424 as shown in FIG. 13. An instruction cache is associated with each segment (see also, FIGS. 4 and 13). The instruction cache utilizes parity error detection through means well known in the art. The instruction cache does not require error correction as it only contains a copy of what is stored in memory storage unit 32 or memory storage unit 34. When a parity error is detected upon reading the instruction cache, a valid copy of the data must be obtained from memory storage unit 32 or memory storage unit 34. Storage data ASIC 0 872 has an instruction cache associated with each of segment 0 and 1, and storage data ASIC 1 874 has an instruction cache associated with each of segment 0 and 1 (see also, FIG. 13). Thus, each storage data ASIC has two pins for reporting instruction cache parity errors, where each pin may report parity errors for segment 0 and 1. Storage data ASIC 0 872 has pin 878 for reporting parity errors from segment 0 and 1, and has pin 880 for reporting parity errors from segment 0 and 1. Storage data ASIC 1 874 has pin 882 for reporting parity errors from segment 0 and 1, and has pin 884 for reporting parity errors from segment 1 and 0. Paths 878, 880, 882 and 884 couple to storage address ASIC 0 876. If an instruction cache parity error is detected upon reading the instruction cache for segment 0 or segment 1 within storage data ASIC 0 872 or storage data ASIC 1 874, the error is reported upon the appropriate path to storage address ASIC 0 876. Once storage address ASIC 0 876 receives the instruction cache parity error, a stack request is sent to the second level cache tag for segment 0 or the second level cache tag for segment 1 in order to degrade the offending second level cache address block so it is not used again for a predetermined time period. The second level cache tags are shown in FIG. 13 where storage address ASIC 0 424 has second level cache tag segment 0 518 and second level cache tag segment 1 520. All subsequent requests to the degraded block will get a miss, whether in second level cache tag segment 0 518 or second level cache tag segment 1 520, and memory storage unit 32 or memory storage unit 34 must be accessed to retrieve the data. Once the data is retrieved, it may be placed within a different block in either second level cache tag segment 0 518 or second level cache tag segment 1 520. Once the predetermined time period ends, the offending cache address block must be degraded again if a subsequent parity error occurs.

Figure 18:
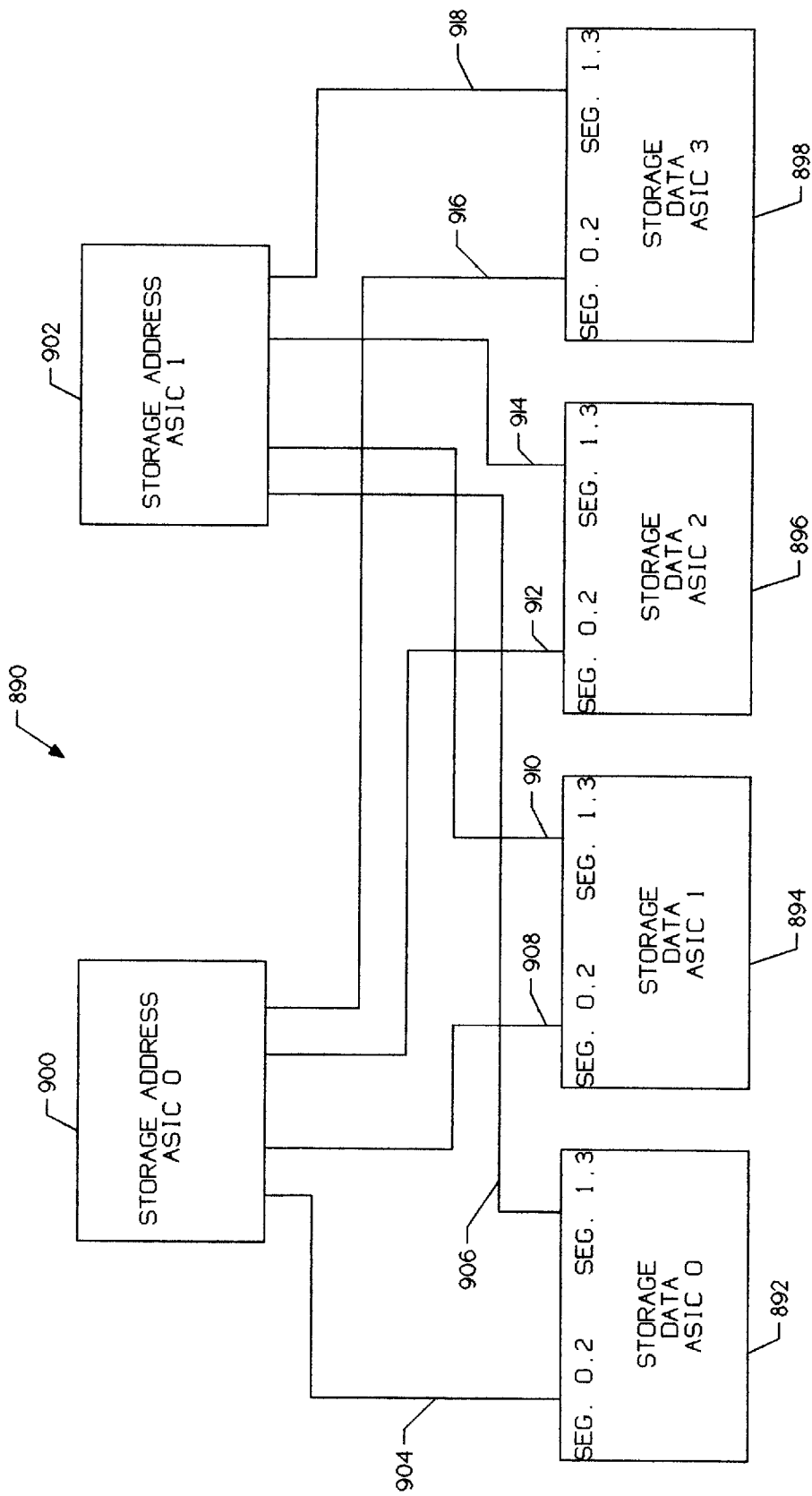
FIG. 18 is a block diagram showing the parity error pin configuration for the maximum-level (MC) configuration.

FIG. 18 is a block diagram showing the parity error pin configuration for the maximum-level (MC) configuration. The parity error pin configuration is shown generally at 890 which includes storage data ASIC 0 892, storage data ASIC 1 894, storage data ASIC 2 896, storage data ASIC 3 898, storage address ASIC 0 900 and storage address ASIC 1 902. Storage data ASIC 0 892 may correspond with storage data ASIC 0 420. Storage data ASIC 1 894 may correspond with storage data ASIC 1 422. Storage data ASIC 2 896 may correspond with storage data ASIC 2 532. Storage data ASIC 3 898 may correspond with storage data ASIC 3 534. Storage address ASIC 0 900 may correspond with storage address ASIC 0 424. Storage address ASIC 1 902 may correspond with storage address ASIC 1 536. These are discussed in reference to FIGS. 14A and 14B. In the MC configuration, each storage data ASIC has two pins for reporting instruction cache parity errors. Each storage data ASIC has a pin for each pair of segments. Storage data ASIC 0 892 reports parity errors for segments 0 and 2 on path 904 which is coupled to storage address ASIC 0 900. Storage data ASIC 0 892 reports parity errors for segments 1 and 3 on path 906 which is coupled to storage address ASIC 1 902. Storage data ASIC 1 894 reports parity errors for segments 0 and 2 on path 908 which is coupled to storage address ASIC 0 900. Storage data ASIC 1 894 reports parity errors for segments 1 and 3 on path 910 which is coupled to storage address ASIC 1 902. Storage data ASIC 2 896 reports parity errors for segments 0 and 2 on path 912 which is coupled to storage address ASIC 0 900. Storage data ASIC 2 896 reports parity errors for segments 1 and 3 on path 914 which is coupled to storage address ASIC 1 902. Storage data ASIC 3 898 reports parity errors for segments 0 and 2 on path 916 which is coupled to storage address ASIC 0 900. Storage data ASIC 3 898 reports parity errors for segments 1 and 3 on path 918 which is coupled to storage address ASIC 1 902. Storage address ASIC 0 900 and storage address ASIC 1 902, thus, each have four input pins to receive parity error reports from storage data ASIC 0 892, storage data ASIC 1 894, storage data ASIC 2 896, and storage data ASIC 3 898. Each storage data ASIC has a second level cache associated with segments 0, 1, 2 and 3 (see, storage data ASIC 0 420, storage data ASIC 1 422, storage data ASIC 2 532, and storage data ASIC 3 534 in FIGS. 14A and 14B). Each storage address ASIC has a second level cache tag corresponding to two of the four segments. Storage address ASIC 0 900 has a second level cache tag for segments 0 and 2, and storage address ASIC 1 902 has a second level cache tag for segments 1 and 3 (see, storage address ASIC 0 424 and storage address ASIC 1 536 in FIGS. 14A and 14B). If a storage data ASIC detects an instruction cache parity error upon reading the instruction cache for any of segments 0–3, the storage data ASIC detecting the error sends a parity error report signal to the corresponding storage address ASIC to report the error. The error is reported to storage address ASIC 0 900 if the error within the second level cache is for an address corresponding to segments 0 and 2, or reported to storage data ASIC 1 902 if the error within the second level cache is for an address corresponding to segments 1 or 3. The storage address ASIC receiving the parity error sends a stack request to the instruction cache tag section to degrade the offending second level cache block so it is not used for a predetermined time period. All subsequent requests to this block will not compare as the degraded second level cache block will no longer be available, and access to memory storage unit 32 or memory storage unit 34 to retrieve the data will result in the data being placed within a different block within the associated second level cache tag. Once the predetermined time period ends, the offending cache address block must be degraded again if a subsequent parity error occurs.

Figure 19:
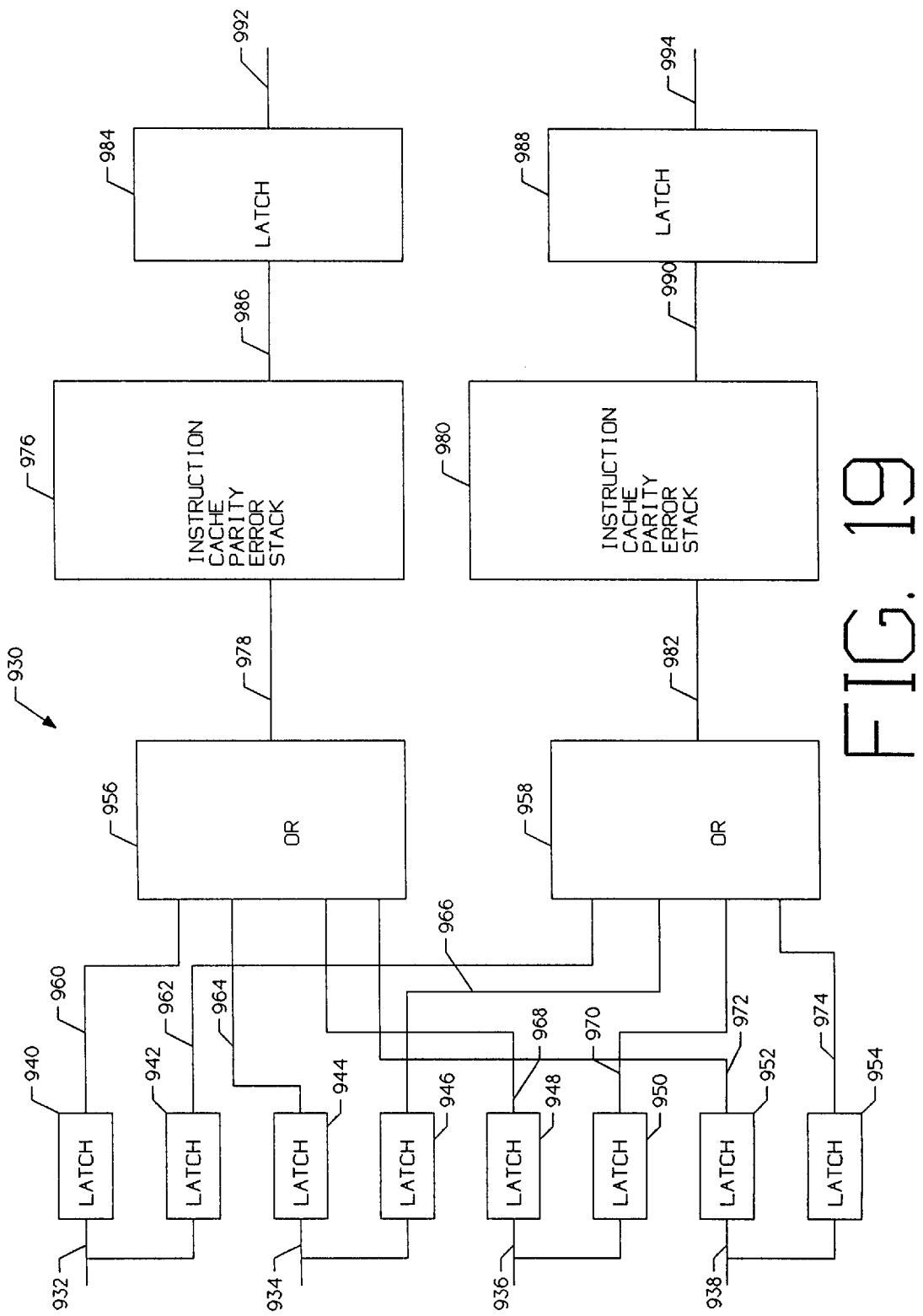
FIG. 19 is a block diagram showing the parity error input logic.

FIG. 19 is a block diagram showing the parity error input logic. Storage address ASIC 0 900 and storage address ASIC 1 902 (for the MC configuration), and storage address ASIC 0 876 (for the EC configuration), have a copy of the input logic which is shown generally at 930. The input logic has inputs 932, 934, 936 and 938. Input paths 932, 934, 936 and 938 may correspond with paths 878, 880, 882, and 884, respectively (see also, FIG. 17). Input paths 932, 934, 936 and 938 may also correspond with paths 904, 908, 912 and 916, respectively, or with paths 906, 910, 914 and 918, respectively (see also, FIG. 18). The input logic receives an instruction cache parity error report on one of paths 932, 934, 936 or 938. Path 932 is coupled to the input of latch 940 and latch 942. Path 934 is coupled to the input of latch 944 and latch 946. Path 936 is coupled to the input of latch 948 and latch 950. Path 938 is coupled to the input of latch 952 and latch 954. Each latch corresponding with a given parity error input couples to one of two OR gates. Latch 940 couples to OR gate 956 via path 960 and latch 942 couples to OR gate 958 via path 962. Latch 944 couples to OR gate 956 via path 964, and latch 946 couples to OR gate 958 via path 966. Latch 948 couples to OR gate 956 via path 968, and latch 950 couples to OR gate 958 via path 970. Latch 952 couples to OR gate 956 via path 972, and latch 954 couples to OR gate 958 via path 974. Each OR gate couples to an instruction cache parity error stack. OR gate 956 couples to instruction cache parity error stack 976 via path 978. OR gate 958 couples to instruction cache parity error stack 980 via path 982. Each instruction cache parity error stack further couples to the input of a latch. Instruction cache parity error stack 976 couples to latch 984 via path 986. Instruction cache parity error stack 980 couples to latch 988 via path 990. Latch 984 couples to stack request logic (not shown) via path 992. Latch 988 couples to stack request logic (not shown) via path 994.

To illustrate the operation of the input logic shown at 930, instruction processor 22, instruction processor 24, instruction processor 26 and instruction processor 28 may all receive an instruction cache parity error for segments 0 and 2 within storage data ASIC 0 892. Storage data ASIC 0 892 has path 904 to report errors on segments 0 and 2, and storage data ASIC 0 892 has path 906 to report instruction cache parity errors for segments 1 and 3. Path 904 would output the parity error information for all four requestors. During a first clock period, a parity error received by instruction processor 22 for segment 0 may be input to latch 940 via path 932. During a second clock period, a parity error received by instruction processor 24 within segment 2 may be clocked into latch 942. During a third clock period, a parity error received by instruction processor 26 from segment 0 may be clocked into latch 940. During a fourth clock period, a parity error received by instruction processor 30 within segment 2 may be clocked into latch 942. Thus, for parity error input path 932, latch 940 and 942 may each clock in a parity error during a different clock period. In a similar fashion, latch 944 and latch 946 may each clock in a parity error during a different clock period, latches 948 and 950 may each clock in a parity error during a different clock period, and latch 952 and latch 954 may each clock in a parity error during a different clock period. Once the input logic shown at 930 receives the parity error reports through latch 940 and latch 942, they are alternately passed through OR gate 956 and OR gate 958 and placed within instruction cache parity error stack 976 and instruction cache parity error stack 980, respectively. The parity error report for instruction processor 22 from segment 0 is placed within instruction cache parity error stack 976, the parity error report from instruction processor 24 for segment 2 is placed within instruction cache parity error stack 980, the parity error report from instruction processor 26 for segment 0 is placed within parity error stack 976, and the instruction cache parity error report received from instruction processor 28 for segment 2 is placed within instruction cache parity error stack 980. Once the parity errors have been received and placed within instruction cache parity error stack 976 and instruction cache parity error stack 980, the parity error request is sent to the stack request logic contained within storage address ASIC 0 900. If a stack request, such as for a read, is received at the same time as an instruction cache parity error request from instruction cache parity error stack 976 or instruction cache parity error stack 980, the original stack request is held and the instruction cache parity error request is sent to priority. Storage address ASIC 0 900, or alternatively storage address ASIC 1 902, may send a stack request to the corresponding instruction cache tag to degrade the offending block.

To determine if the data is available in one of the second level cache memories (e.g. one of second level cache data segments 0–3), the corresponding instruction cache tag (e.g. one of second level cache tag segments 0–3) is provided a first portion or set address from the request address (see also, FIG. 13, FIG. 14 and FIG. 15). A result stored within the instruction cache tag at an address corresponding to the first portion or set address is compared with a second portion or block address of the request address (see also, FIG. 13, FIG. 14 and FIG. 15). If the result and the block address are equal, the requested data is contained within the corresponding second level cache memory at an address corresponding to the first portion. If the result and the block address are not equal, the requested data is not contained within the corresponding second level cache memory. A cache hit will occur if the block address portion of the request address matches the block address stored within the corresponding second level cache tag, and a cache miss will occur if the block address portion of the request address does not match the block address stored within the corresponding second level cache. The second level cache is degraded by writing degrade data into the corresponding tag memory at an address corresponding to the first portion to indicate that the address location corresponding to the first portion within the corresponding second level cache memory is not to receive any more data. The request address including the first portion is held in the event a parity error occurs so that the second level cache may be degraded. Once the offending block within the second level cache tag has been degraded, a cache miss will occur since the block address portion of the request address will not match the block address contained within the second level cache tag. Thus, all subsequent requests to this block will get a miss and must access memory storage units 32 or 34 to retrieve the data. The data may then be placed within a different block within the corresponding second level cache. A further discussion of the operation of the storage address ASICs may be found in the above-referenced and co-pending U.S. patent application, Ser. No. 08/777,038, filed Dec. 30, 1996, entitled "Scalable Cross Bar Type Storage Controller".

FIG. 20 is a diagram showing the address format for degrading the instruction cache. Once an instruction cache parity error report is selected from instruction cache parity error stack 976 or instruction cache parity error stack 980 for priority (see also, FIG. 19), the instruction cache address corresponding to the error is degraded so that the address location is not referenced again. The function code sent to the instruction cache tag is a Write Second Level Cache Tag State Bits function code for writing degrade data into the instruction cache tag. The second cycle is shown generally at 998 and shows the bits comprising the Write Second Level Cache Tag State Bits function code. The address format shown at 998 corresponds to the second cycle shown at 804 in FIG. 15. Bits F4 to F6 are part of the function code. Bits 29 and 34 are parity bits. Bits 34 and 35 are the degrade data or degrade state bits block.

Having thus described the preferred embodiments of the present invention, those of skill in the art will readily appreciate that the teachings found herein may be applied to yet other embodiments within the scope of the claims hereto attached.

What is claimed is:

1. An apparatus for correcting parity errors having a plurality of requesters and a shared memory, the shared memory having a plurality of segments, each of the plurality of segments having a plurality of address locations, each of the plurality of segments corresponding to one or more cache memories and one or more tag memories, comprising:

a. one or more reporting means coupled to the one or more cache memories for reporting a particular one of a number of parity errors at a particular one of the plurality of address locations within a particular one of the one or more cache memories;

b. identifying means coupled to said reporting means for identifying said particular one of the plurality of address locations within said particular one of the one or more cache memories; and c. degrading means coupled to said identifying means for degrading said particular one of the plurality of address locations within said particular one of the one or more cache memories by writing degrade data into a particular one of the one or more tag memories at an address corresponding to a first portion of said particular one of the plurality of address locations to indicate that said particular one of the plurality of address locations of said particular one of the one or more cache memories is not to receive any data for a predetermined time period, a result stored within said particular one of the one or more tag memories at said address corresponding to said first portion being compared with a second portion of a request address, said result being equal to said second portion indicating that said particular one of the plurality of address locations of said particular one of the one or more cache memories contains said data, said result not being equal to said second portion indicating that said particular one of the plurality of address locations of said particular one of the one or more cache memories does not contain said data.

2. An apparatus according to claim 1 wherein the one or more cache memories are instruction cache memories.

3. An apparatus according to claim 2 wherein said instruction cache memories are static random access memories.

4. An apparatus according to claim 2 wherein said instruction cache memories are dynamic random access memories.

5. An apparatus according to claim 1 wherein said one or more reporting means further comprises means to detect said particular one of said number of parity errors.

6. An apparatus according to claim 5 wherein said means to detect said particular one of said number of parity errors detects single bit errors.

7. An apparatus according to claim 1 wherein said identifying means comprises:

a. one or more receiving means wherein each particular one of said one or more receiving means is coupled to a particular one of said one or more reporting means for receiving a particular one of a number of parity error reports from said particular one of said one or more reporting means;

b. one or more parity error storing means wherein each particular one of said one or more parity error storing means is coupled to said particular one of said one or more receiving means to store said particular one of said number of parity error reports; and c. one or more request storing means coupled to the plurality of requesters for storing a request, each said request having said particular one of the plurality of address locations and a function, each said particular one of said number of parity error reports corresponding to said particular one of the plurality of address locations.

8. An apparatus according to claim 7 wherein each said particular one of said one or more receiving means comprises a latch for storing said particular one of said number of parity error reports.

9. An apparatus according to claim 7 wherein each said particular one of said one or more parity error storing means is a stack.

10. An apparatus according to claim 9 wherein said stack stores up to eight parity error reports.

11. An apparatus according to claim 9 wherein said stack is an instruction cache parity error stack.

12. An apparatus according to claim 1 wherein the degrading means comprises priority means to determine which said particular one of the plurality of address locations to degrade, each said particular one of said number of parity errors corresponding to said particular one of the plurality of address locations within said particular one of the one or more cache memories.

13. An apparatus according to claim 12 wherein said first portion comprises a set address.

14. An apparatus according to claim 12 wherein said second portion comprises a block address.

15. An apparatus according to claim 12 wherein said degrading means comprises a Write Second Level Cache Tag State Bits function code for writing said degrade data into said particular one of the one or more tag memories at said address corresponding to said first portion of said particular one of the plurality of address locations to indicate that said particular one of the plurality of address locations of said particular one of the one or more cache memories corresponding to said first portion is not to receive any said data for a predetermined time period.

16. An apparatus according to claim 15 wherein said degrade data comprises one or more data bits.

17. An apparatus according to claim 16 wherein said one or more data bits are two degrade state bits.

18. A method for correcting parity errors having a plurality of requesters and a shared memory, the shared memory having a plurality of segments, each of the plurality of segments having a plurality of address locations, and each of the plurality of segments corresponding to one or more cache memories and one or more tag memories, the method comprising the steps of:

a. reporting a particular one of a number of parity errors at a particular one of the plurality of address locations within a particular one of the one or more cache memories;

b. identifying said particular one of the plurality of address locations within said particular one of the one or more cache memories; and c. degrading said particular one of the plurality of address locations within said particular one of the one or more cache memories by writing degrade data into a particular one of the one or more tag memories at an address corresponding to a first portion of said particular one of the plurality of address locations to indicate that said particular one of the plurality of address locations of said particular one of the one or more cache memories is not to receive any data for a predetermined time period, a result stored within said particular one of the one or more tag memories at said address corresponding to said first portion being compared with a second portion of a request address, said result being equal to said second portion indicating that said particular one of the plurality of address locations of said particular one of the one or more cache memories contains said data, said result not being equal to said second portion indicating that said particular one of the plurality of address locations of said particular one of the one or more cache memories does not contain said data.

19. A method according to claim 18 wherein the step of identifying further comprises the steps of:

a. receiving a particular one of a number of parity error reports;
b. storing said particular one of said number of parity error reports; and
c. storing a request, each said request having said particular one of the plurality of address locations and a function, each said particular one of said number of parity error reports corresponding to said particular one of the plurality of address locations.

20. A method according to claim 18 wherein the step of degrading further comprises the step of determining which said particular one of the plurality of address locations to degrade, each said particular one of said number of parity errors corresponding to said particular one of the plurality of address locations within said particular one of the one or more cache memories.

* * * * *